(12) United States Patent
Stork genannt Wersborg

(10) Patent No.: US 12,490,856 B2
(45) Date of Patent: Dec. 9, 2025

(54) MONITORING SYSTEM AND FOOD PREPARATION SYSTEM

(71) Applicant: INTERPRODUCTEC CONSULTING GMBH & CO. KG, Munich (DE)

(72) Inventor: Ingo Stork genannt Wersborg, Munich (DE)

(73) Assignee: Interproductec Consulting GmbH & Co. KG, Munich (DE)

( * ) Notice: Subject to any disclaimer, the term of this patent is extended or adjusted under 35 U.S.C. 154(b) by 234 days.

(21) Appl. No.: 16/648,035

(22) PCT Filed: Sep. 7, 2018

(86) PCT No.: PCT/EP2018/074227
§ 371 (c)(1),
(2) Date: Mar. 17, 2020

(87) PCT Pub. No.: WO2019/052929
PCT Pub. Date: Mar. 21, 2019

(65) Prior Publication Data
US 2020/0253415 A1     Aug. 13, 2020

(30) Foreign Application Priority Data

Sep. 18, 2017  (EP) .................... 17001555
Oct. 20, 2017  (EP) .................... 17002011
(Continued)

(51) Int. Cl.
*A47J 36/32*  (2006.01)
*A47J 27/00*  (2006.01)
*H05B 6/64*  (2006.01)

(52) U.S. Cl.
CPC ............. *A47J 36/32* (2013.01); *A47J 27/004* (2013.01); *H05B 6/6435* (2013.01)

(58) Field of Classification Search
CPC ......... A47J 27/004; A47J 36/32; F24C 7/085; H05B 6/6435; H05B 6/6447
(Continued)

(56) References Cited

U.S. PATENT DOCUMENTS 4,744,407 A * 5/1988 Fishman ................ B22D 37/00
                                                   164/155.2
5,504,311 A * 4/1996 DuBuis ..................... H05B 6/66
                                                   99/325

(Continued)

FOREIGN PATENT DOCUMENTS

CN     101504158 A    8/2009
CN     104246375 A    12/2014
(Continued)

OTHER PUBLICATIONS

Translation A claims DE 102008031378 (Year: 2022).*
(Continued)

*Primary Examiner* — Elizabeth M Kerr
*Assistant Examiner* — Simpson A Chen
(74) *Attorney, Agent, or Firm* — Brooks Kushman P.C.

(57) ABSTRACT

A monitoring system (10) for a food preparation system (100, 200, 300) comprises a sensor unit 114; 214, 216, 222; 308, 312, 308a, 308b) having at least one sensor to determine current sensor data of food being loaded or unloaded to or from a food processing chamber (102; 236; 302) of the food preparation system (100, 200, 300); a processing unit (1820) to determine current feature data from current sensor data; a classification unit (1840) to determine characteristic data of food (228, 232) being present within the food processing chamber (102; 236; 302) from the current feature data; and a control unit (1860) to control at least on actuator adapt ed to inform or alert an user or to set processing parameters of the food preparation system (100, 200, 300)

(Continued)

based on the determined characteristic data of food being present within the food processing chamber (102; 236; 302).

20 Claims, 14 Drawing Sheets

(30) Foreign Application Priority Data

Apr. 13, 2018 (EP) .................................... 18167371
Apr. 16, 2018 (EP) .................................... 18167618

(58) Field of Classification Search
USPC ........................................................... 99/334
See application file for complete search history.

(56) References Cited

U.S. PATENT DOCUMENTS

| | | | | |
|---|---|---|---|---|
| 6,397,734 | B1* | 6/2002 | Atzinger | A21C 13/00 99/468 |
| 6,451,152 | B1* | 9/2002 | Holmes | B29C 66/91221 156/308.2 |
| 6,594,090 | B2* | 7/2003 | Kruschwitz | G02B 27/0927 348/E9.026 |
| 6,713,741 | B2* | 3/2004 | Miller | A21B 1/48 219/699 |
| 7,196,298 | B2* | 3/2007 | Åkerlind | H05B 6/6441 374/149 |
| 9,056,368 | B2* | 6/2015 | Stork Genannt Wersborg | B23K 26/02 |
| 9,492,886 | B2* | 11/2016 | Stork Genannt Wersborg | B23K 26/02 |
| 9,644,847 | B2* | 5/2017 | Bhogal | F24C 15/008 |
| 9,702,858 | B1* | 7/2017 | Minvielle | A47J 36/321 |
| 9,802,271 | B2* | 10/2017 | Stork Genannt Wersborg | B23K 26/0648 |
| 10,101,035 | B1* | 10/2018 | Thrun | F24C 7/087 |
| 10,154,749 | B2* | 12/2018 | Riefenstein | H05B 6/6441 |
| 10,306,711 | B2* | 5/2019 | Monahan | H05B 6/6414 |
| 10,687,391 | B2* | 6/2020 | Cochran | H05B 3/0057 |
| 11,072,094 | B2* | 7/2021 | Cochran | B29C 49/64 |
| 11,375,587 | B2* | 6/2022 | Bassill | H05B 6/6464 |
| 11,680,712 | B2* | 6/2023 | Bhogal | G06F 18/2431 99/325 |
| 2002/0005892 | A1* | 1/2002 | Herre | G01N 21/8806 348/125 |
| 2004/0197012 | A1* | 10/2004 | Bourg, Jr. | G06T 7/0004 382/110 |
| 2009/0017173 | A1* | 1/2009 | Kozman | G01N 33/10 426/233 |
| 2010/0055259 | A1* | 3/2010 | Bourg, Jr. | G01N 33/02 702/25 |
| 2011/0002677 | A1* | 1/2011 | Cochran | H05B 3/148 392/407 |
| 2012/0076351 | A1* | 3/2012 | Yoon | F24C 7/085 382/100 |
| 2013/0169814 | A1* | 7/2013 | Liu | H04N 7/183 348/151 |
| 2013/0186887 | A1* | 7/2013 | Hallgren | H05B 6/688 219/702 |
| 2013/0302483 | A1* | 11/2013 | Riefenstein | H05B 6/6455 382/110 |
| 2015/0014305 | A1* | 1/2015 | Monahan | H05B 6/6414 219/720 |
| 2015/0056344 | A1* | 2/2015 | Luckhardt | F24C 7/081 426/233 |
| 2017/0074522 | A1* | 3/2017 | Cheng | H05B 6/6441 |
| 2017/0176019 | A1* | 6/2017 | Bhogal | A23L 5/17 |
| 2017/0188416 | A1* | 6/2017 | Beifuss | H05B 6/6447 |
| 2018/0184668 | A1* | 7/2018 | Stork genannt Wersborg | A21B 3/10 |
| 2019/0141797 | A1* | 5/2019 | Imai | F24C 7/02 |
| 2020/0072471 | A1* | 3/2020 | Luckhardt | F24C 7/085 |
| 2020/0088412 | A1* | 3/2020 | Bhogal | F24C 7/086 |
| 2020/0103120 | A1* | 4/2020 | Bhogal | A23L 5/15 |
| 2020/0182480 | A1* | 6/2020 | Bhogal | F24C 7/087 |
| 2020/0245809 | A1* | 8/2020 | Klasmeier | A23L 5/13 |
| 2020/0260529 | A1* | 8/2020 | de Menezes Pereira | F24C 7/085 |
| 2020/0267996 | A1* | 8/2020 | Stork genannt Wersborg | F24C 15/008 |
| 2021/0102708 | A1* | 4/2021 | Bhogal | F24C 7/087 |
| 2021/0148577 | A1* | 5/2021 | Bhogal | F24C 7/086 |
| 2021/0222885 | A1* | 7/2021 | Alvey | F24C 7/062 |

FOREIGN PATENT DOCUMENTS

| | | | |
|---|---|---|---|
| CN | 105120722 | A | 12/2015 |
| DE | 10 2008 031378 | A1 | 1/2009 |
| DE | 102017113619 | * | 12/2018 |
| EP | 1709895 | * | 10/2006 |
| EP | 2 662 628 | A1 | 11/2013 |
| EP | 2662628 | B1 | 11/2019 |
| JP | 2022-158286 | * | 10/2022 |
| WO | 1992016083 | A1 | 9/1992 |
| WO | WO 92/16083 | A1 | 9/1992 |
| WO | 2010102261 | A1 | 9/2010 |
| WO | 2013167948 | A2 | 11/2013 |
| WO | 2014132121 | A1 | 9/2014 |
| WO | 2015130329 | A1 | 9/2015 |
| WO | 2015185211 | A2 | 12/2015 |
| WO | 2016131109 | A1 | 8/2016 |

OTHER PUBLICATIONS

Translation A claims DE 102008031378 spec (Year: 2022).*
WO2015/130329 (Year: 2024).*
EPO Office Action mailed Sep. 13, 2021 for Application No. EP18769321.3 (6 pages).
International Search Report and Written Opinion mailed on Nov. 29, 2018 in corresponding International Application No. PCT/EP2018/074227.
EPO Communication Pursuant to Article 94(3) EPC mailed Feb. 15, 2024 in related application No. EP18769321.3 (7 pages).
China State Intellectual Property Office - Office Action mailed Feb. 29, 2024 for related application No. CN201880067214.7 (14 pages; with English translation).
CN Rejection Decision dated Oct. 14, 2024.
CA Examination Report dated Nov. 7, 2024.

* cited by examiner

Fig. 4
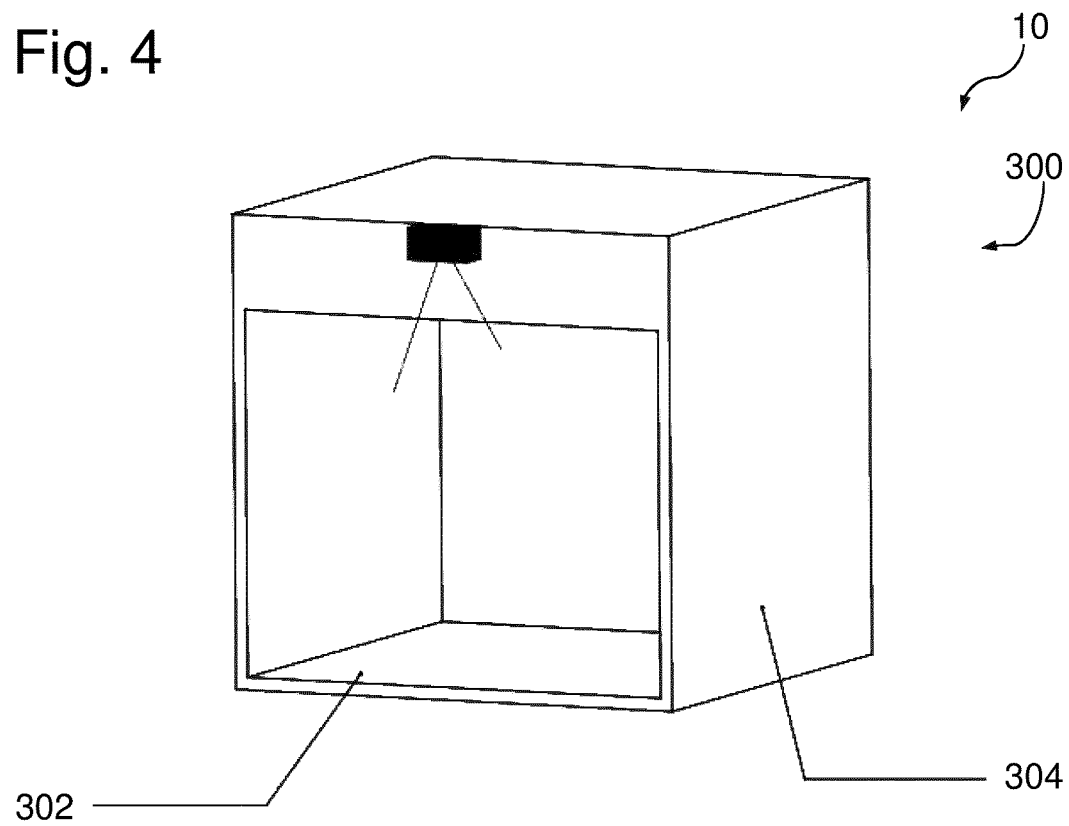
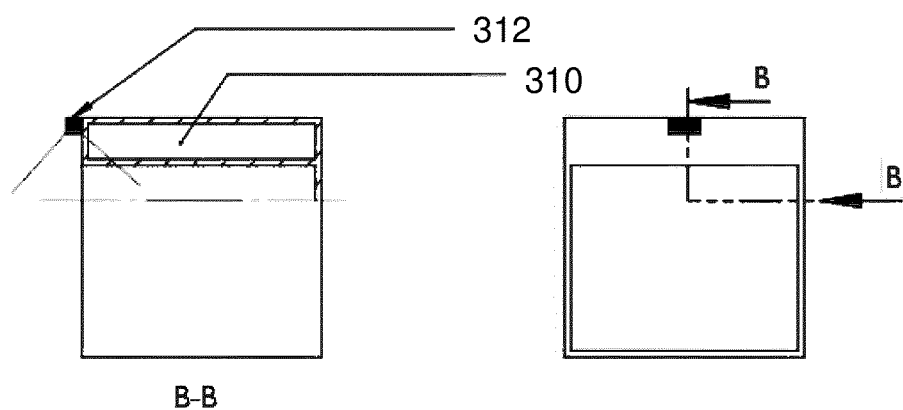

Fig. 8
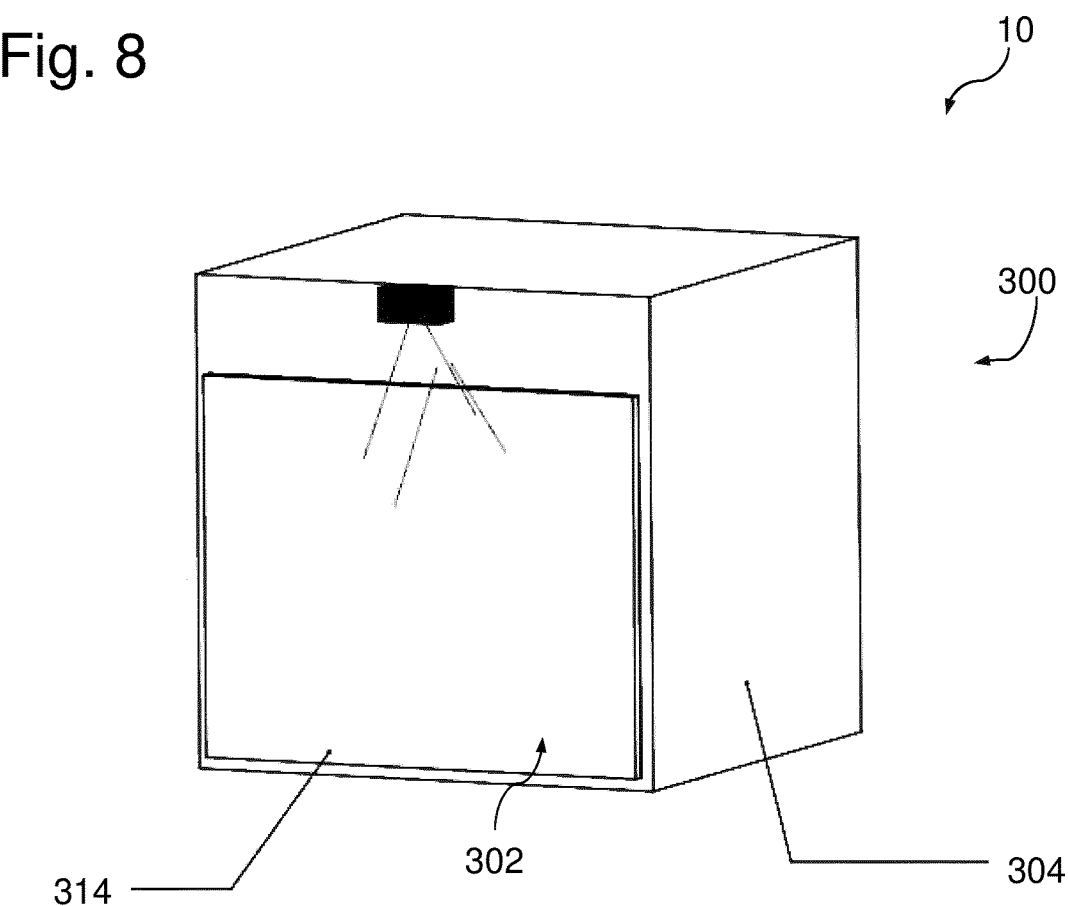
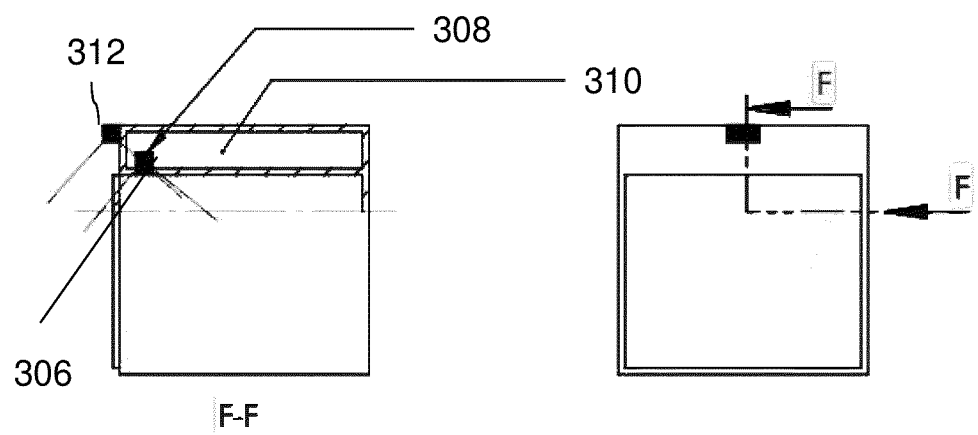
F-F

MONITORING SYSTEM AND FOOD PREPARATION SYSTEM

CROSS-REFERENCE TO RELATED APPLICATIONS

This application is the National Stage entry under 35 U.S.C. § 371 of International Application No. PCT/EP2018/074227 filed on Sep. 7, 2018, published on Mar. 21, 2019 under Publication Number WO 2019/052929 A1, which claims the benefit of priority under 35 U.S.C. § 119 of European Patent Application Numbers 17001555.6 filed on Sep. 18, 2017, 17002011.9 filed on Oct. 20, 2017, 18167371.6 filed on Apr. 13, 2018 and 18167618.0 filed on Apr. 16, 2018, the entireties of which are herein incorporated by reference.

The present invention is related to a heat treatment monitoring system, in particular a monitoring system for heating, cooking, baking, hot holding, steaming, poaching, sous vide, boiling, or proofing of food or food stuff to be heated like meat, chicken, vegetables, pizza, bread, pastry, dough or the like and trays or cooking pans as well as optionally a removable rack structure or loading system to the heat treatment chamber.

Loading and unloading a heat treatment machine is a common process in cooking and baking. This may be done by hand directly for the heat treatment machine. But for the purpose of saving time and efforts loading and unloading a heat treatment machine is often done with a removable rack system positioned in front of the heat treatment machine, such as a rack wagon with several trays of food positioned in front of a heat treatment chamber such as an oven or combi steamer or microwave or turbo ovens.

Many inventions discuss the process on how to position and align such a rack wagon or rack structure so an automated loading and unloading of an oven can happen, such as DE102013100298B4, U.S. Pat. No. 7,183,521B2. Many inventions discuss the possibility to observe a heat treatment process such as baking or proofing with visual sensors such as a camera or an array of photodiodes such as WO002014086486A3 or DE102013110642A1.

It is an object of the present invention to provide a monitoring system and a food preparation system by which food to be processed can be efficiently monitored to ensure a reliable quantification, classification or evaluation of the same.

This object is solved by the subject-matter of the independent claims. Further advantageous embodiments and refinements of the present invention are described by the respective sub-claims.

According to an embodiment of the present invention, a monitoring system (10) for a food preparation system (100, 200, 300), comprises a sensor unit (1810) having at least one sensor (114; 214, 216, 222; 308, 312, 308a, 308b) to determine current sensor data of food (240) being loaded or unloaded to or from a food processing chamber (102; 236; 302) of the food preparation system (100, 200, 300); a processing unit (1820) to determine current feature data from current sensor data; a classification unit (1850) to determine characteristic data of food (228, 232) being present within the food processing chamber (102; 236; 302) from the current feature data; and a control unit (1860) being adapted to inform or alert an user or to set operation parameters of the food preparation system (100, 200, 300) based on the determined characteristic data of food being present within the food processing chamber (102; 236; 302).

Preferably, the food preparation system (100, 200, 300) may be a heat treatment system for food and the food processing chamber (102; 236; 302) is a heat treatment chamber.

Preferably, a heating process of the food (228, 232) being present within the food processing chamber (102; 236; 302) may be controlled by electromagnetic energy in radio frequency range based on the characteristic data of the food (228, 232).

Preferably, the characteristic data of the food (228, 232) may be at least one of a classified kind of food and a position of the food within the food processing chamber (102; 236; 302).

Preferably, after the different varieties of food in the different zones of the food processing chamber (102; 236; 302) has been detected by the sensor unit (1810), different amount of electromagnetic energy in radio frequency, specific for the detected food may be used to heat up, or cook the food.

Preferably, the characteristic data of the food (228, 232) comprises the quantity of at least one piece of food (228, 232) being present within the food processing chamber (102; 236; 302).

Preferably, the characteristic data of the food (228, 232) may further comprise at least one of the respective size, the respective type or kind, the respective position within the food processing chamber, or the respective duration being located within the food processing chamber of the at least one piece of food being present within the food processing chamber (102; 236; 302).

Preferably, the sensor unit (1810) may comprise at least one camera.

Preferably, the sensor unit (1810) may further comprise an optical system with at least one lens to capture sensor data from an area or space in front of the food processing chamber (102; 236; 302).

Preferably, the control unit (1810) is adapted to determine optimized operation parameters of the food preparation system (100, 200, 300) based on the determined characteristic data of food being present within the food processing chamber (102; 236; 302).

Preferably, the control unit (1810) is adapted to track and quantify food being loaded or unloaded to or from a food processing chamber (102; 236; 302) based on the determined characteristic data of food being present within the food processing chamber (102; 236; 302).

Preferably, the control unit (1810) is adapted to perform scheduling intended for production management between process steps of the food preparation process.

A food preparation system (100, 200, 300) may comprise a food processing chamber (102; 236; 302) for food (240) being loaded or unloaded to or from the same; and the monitoring system (10) of the present invention.

The food preparation system (100, 200, 300) may further comprise a food processing chamber door (106, 238) including the sensor unit (1810) adapted to observe an area or space in front of the food processing chamber (102; 236; 302) when the food processing chamber door (106, 238) is opened.

Preferably, the sensor unit (1810) is located above the food processing chamber (102; 236; 302) to observe an area or space in front of or within the food processing chamber (102; 236; 302) through an aperture (306) in the ceiling part of the food processing chamber (102; 236; 302), which is closed by a window being flush with the ceiling part of the food processing chamber (102; 236; 302).

The accompanying drawings, which are included to provide a further understanding of the invention and are incorporated in and constitute a part of this application, illustrate embodiment(s) of the invention and together with the description serve to explain the principle of the invention. In the drawings:

FIGS. 3 to 11 show schematic views of still another embodiments of a monitoring system for a food preparation system.

FIGS. 1A and 1B show an embodiment of the present invention.

Figure 1A:
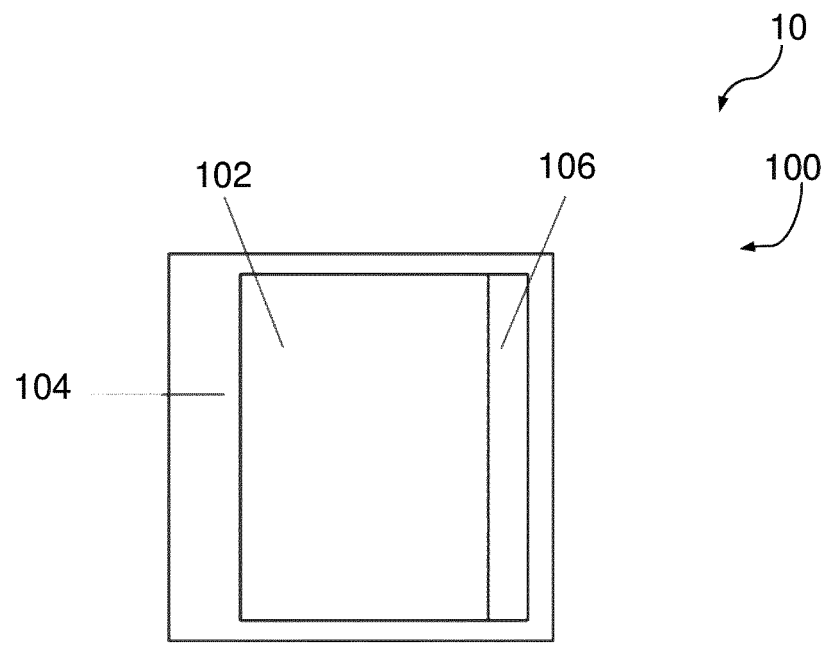
FIG. 1A shows a schematic front view of an embodiment of a monitoring system for a food preparation system.

It is an embodiment of the present invention to provide a monitoring system 10 to monitor food being loaded and unloaded of a food preparation chamber or heat treatment chamber 102, as illustrated in FIG. 1A, Reference Sign 102, either by hand or by a device for loading and unloading the heat treatment chamber 102. The heat treatment chamber 102 has walls 104 to all sides with a certain thickness, as illustrated in FIG. 1A, Reference sign 104, and an opening for a door 106 to one side and a door 106, as illustrated in FIG. 1A, Reference Sign 106, to open and close the heat treatment chamber 102. In another embodiment of the present invention, the monitoring system 10 does both monitoring the area in front of the heat treatment chamber 102 as well as observing the inside of the heat treatment chamber 102.

The monitoring results may be used to store information for quality insurance or to use it as data for a machine learning system such as using deep neural networks or for initiating process steps with the heat treatment chamber 102 such as pre-heating or creating a certain climate in the heat treatment chamber 102 or opening and closing the door 106 or starting or adapting a cooking or baking or proofing program. In order to monitor the food or food stuff being loaded or unloaded into a food preparation system 100 or heat treatment machine, sensors such as a camera or a photo diode array or photodiodes or beam sensors can be used. If necessary, the sensor capture or images can be improved by using illumination either from the heat treatment chamber or for the purpose of illuminating the area observed by the sensor.

Illumination sources could be light bulbs, halogen lamp, fluorescent tubes, LEDs or laser diodes. The illumination sources can be mounted around the opening of the heat treatment chamber, the door of the heat treatment chamber, between the typical double glass structures of an oven or combi steamer or microwave or heat treatment machine door and can also be combined with the sensor mounting. Especially in heat treatment chambers that treat food or food stuff, the influence of heat can be harmful for the sensor or sensors used to monitor the food processing or the food preparation. The positioning of the sensor, its alignment, eventually its optical system is critical to reduce heat impact and secure the sensor from water, steam, fats, flowers or any other influence arising from preparing or processing food or food stuff and to use as few sensors as possible with the most possible observation area of the loading and unloading process as well as while processing the food.

Figure 1B:
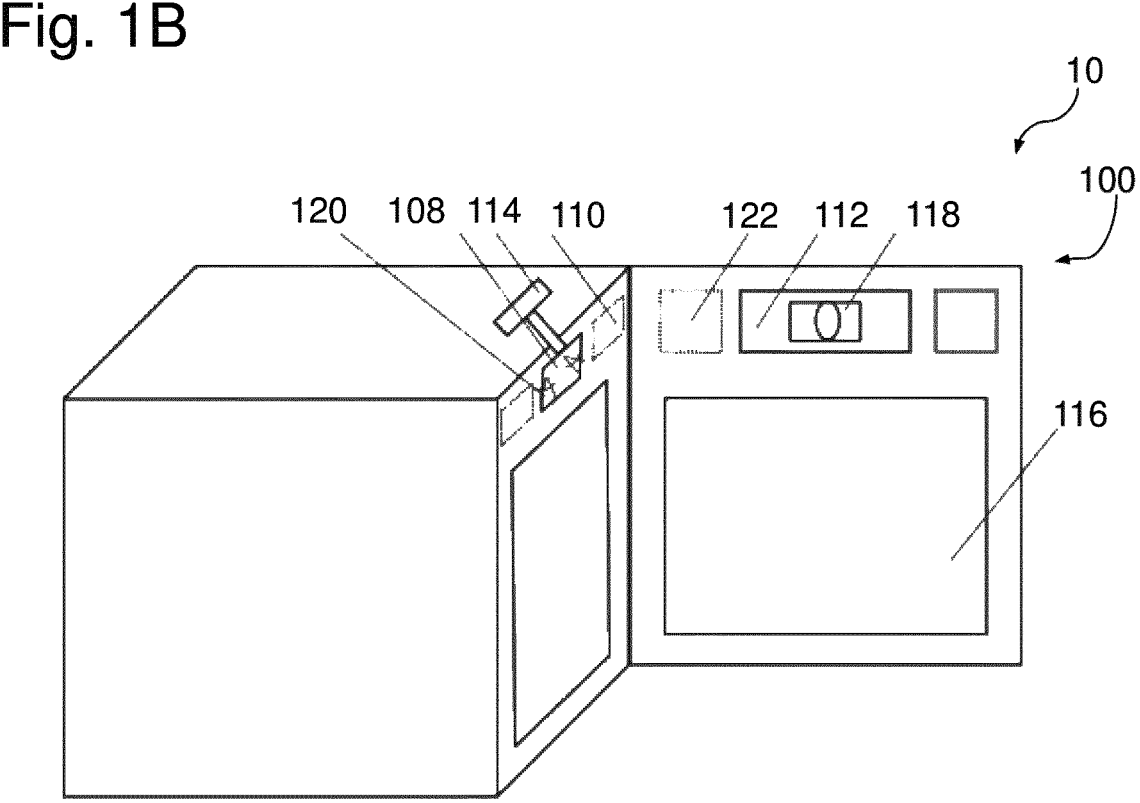
FIG. 1B shows a schematic perspective view of an embodiment of a monitoring system for a food preparation system.

It is beneficial to use sensor mountings that can easily be exchanged, either only the parts that get dirty or the whole sensor unit itself. It is object of the invention to position the sensor unit above the heat treatment chamber, as illustrated in FIG. 1B, either in the center of the opening, FIG. 1B, reference sign 108, or on the sides FIG. 1B, reference sign 110, or any other part above the heat treatment chamber 102, aligned to observe the outside of the oven, both when the door is closed as in FIG. 1A, as well as when it is opened, as in FIG. 1B. If the door is closed one or two glass windows 112, FIG. 1B, reference sign 112, integrated into the oven door 106 could be used to allow the sensor to view through the door 106 to the front area of the heat treatment chamber 102. There can be several positions in the heat treatment chamber door or door frame to integrate these observation windows or centered windows could be used as illustrated in FIG. 1B, reference signs 122 and 116. These windows can also be designed to be heated or cooled and with various wavelength reflectivities.

The alignment of the sensor could be done in a way that the sensor observes the front of the oven through the existing heat treatment chamber door windows, as illustrated in FIG. 1B, reference sign 116.

The sensor unit 114 can also be mounted with a mounting device mounted above the heat treatment chamber door such as with an arm or as mounted at an optional hood, as illustrated in FIG. 1A, reference sign 114. The sensor unit can also be designed to have different sensor alignments or to be able to move the sensor or the mounting and change its alignment, as illustrated in FIG. 1A, reference sign 120.

An optical system 118, as illustrated in FIG. 1A, reference sign 118, consisting of a lens or several lenses or reflective surfaces such as mirrors also consisting of convex or concave shapes could be used to either maximize the sensor observable area such as the in front of the oven. The optical system 118 can either be mounted above the heat treatment chamber opening or within the door of the heat treatment chamber. It is beneficial to use surfaces in the mounting and surrounding the sensor that have less reflectivity such as in matte black color. The optical system could have use coatings or surfaces reflective to certain wavelengths that protect the optical system 118 from infrared heating. The optical system 118 can also be designed in a way that it allows both, a view into the heat treatment chamber 102 and in front of the heat treatment chamber 102.

If the sensor 114 is a camera, it is embodiment of the invention to have the optical system 118 designed in a way that one part of the image represents a view into the heat treatment chamber 102 and another part of the image represents a view in front of the heat treatment chamber 102.

The sensor unit 114 is connected to a processing unit that processes the sensor data and determines feature data. Feature data could consist of detecting food or food stuff being present in the observation area, determining the kind of food and selecting cooking or baking programs, or observing moving directions to determine loading and unloading processes and the level or positioning in the heat treatment chamber 102 by the means of using machine learning or image processing methods.

Thus a, a heat treatment and food preparation monitoring system is provided, comprising: a sensor unit having at least one sensor to determine current sensor data of food being heated or being loaded to and from the heat treatment chamber; a processing unit to determine current feature data from current sensor data; and an optical system with at least one lens to capture sensor data from in front of the heat treatment chamber. The heat treatment monitoring and food preparation monitoring system may further comprise a sensor unit that consists of or comprises at least one camera. The heat treatment monitoring system and food preparation monitoring may further comprise a heat treatment chamber door that consists of or comprises at least one glass window. The heat treatment monitoring system and food preparation monitoring may further comprise a heat treatment chamber door that consists of or comprises a loading system.

Figure 2:
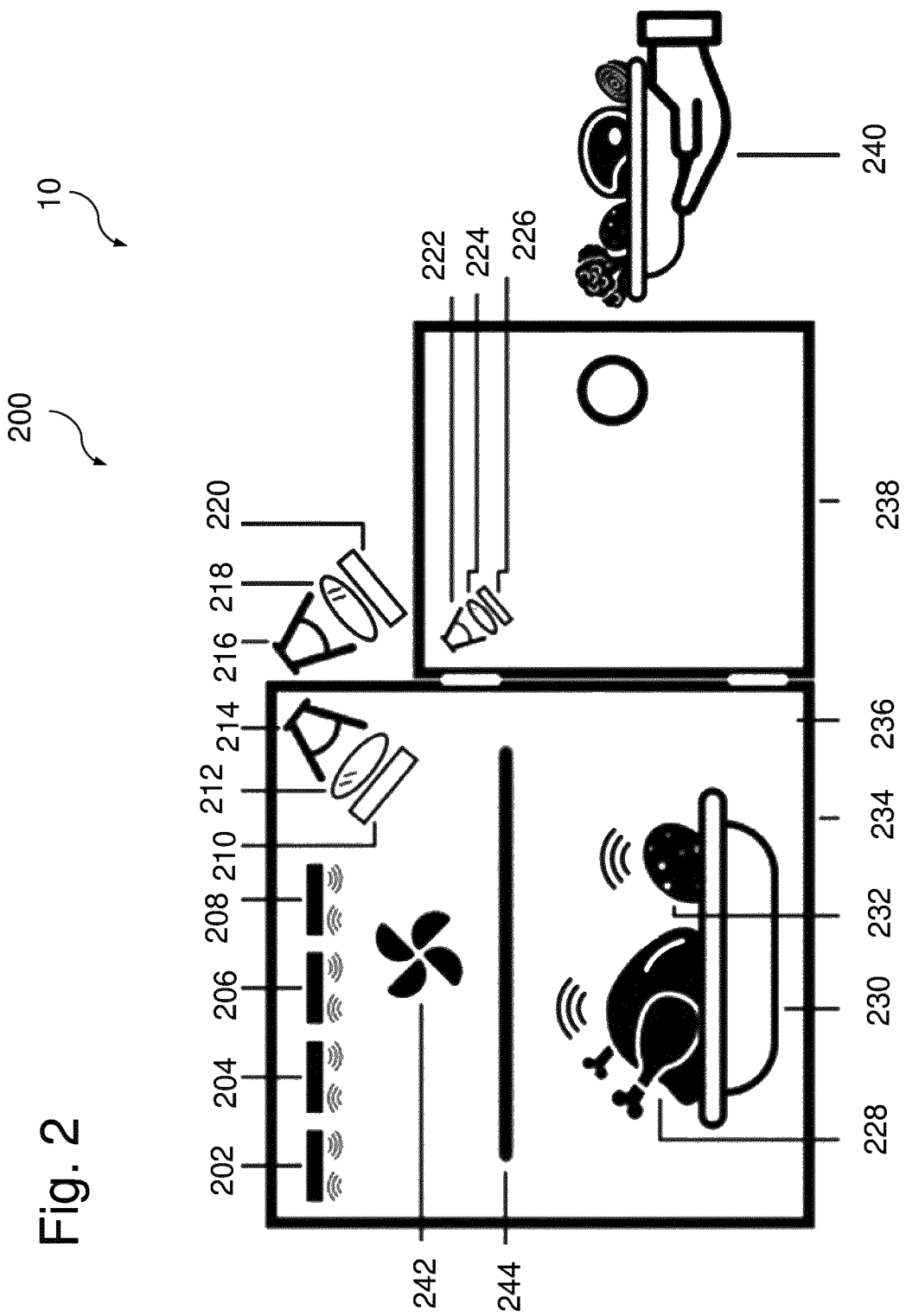
FIG. 2 shows a schematic front view of another embodiment of a monitoring system for a food preparation system.

FIG. 2 shows a schematic front view of another embodiment of a monitoring system 10 for a food preparation system 200.

This embodiment is related to a monitoring system or heat treatment monitoring system 10, in particular a monitoring system 10 for heating, cooking, baking or proofing of food or food stuff to be heated like meat, chicken, vegetables, pizza, bread, pastry, dough or the like and trays or cooking pans as well as optionally a preparation structure or plate or trays or loading system for the heat treatment chamber.

Loading and unloading a heat treatment machine is a common process in cooking and baking and heating food stuff. This may be done by hand directly for the heat treatment machine. But for the purpose of saving time and efforts loading and unloading a heat treatment machine is often done with a loading system positioned in front of the heat treatment machine, such as a rack wagon with several trays of food positioned in front of a heat treatment chamber such as an oven or combi steamer or microwave or turbo ovens or ovens using electromagnetic energy in radio frequency range. Radio frequency (RF) energy may be used to heat and cook food also called RF cooking or dry materials. Common wavelength in cooking applications could be but are not limited to 868 and 915 MHZ industrial, scientific and medical (ISM) radio bands as well as around 2.4 GHz. Often also antennas 202 to 208 are positioned within the heat treatment chamber or oven cavity in order to capture the reflected RF energy, as illustrated in FIG. 2, reference signs 202 to 208. It is state of the art to receive an indicator of the target electromagnetic field intensity distribution and to compute the target field intensity distribution based on the indicator. This information can be used to control the amount of RF energy with different intensities within a heat treatment chamber or oven cavity.

It is an advantageous embodiment of the present invention to monitor and identify food and state of the food being loaded and unloaded into or out of the oven and to detect what kind of food is loaded in which zone of a heat treatment chamber 236, as illustrated in FIG. 2, reference sign 236, either by hand or by a device for loading and unloading the heat treatment chamber 236 or in a preparation area or within a range or cooking field or pan.

The heat treatment chamber or oven cavity or microwave has walls 234 to all sides with a certain thickness, as illustrated in FIG. 2, reference sign 234, and an opening for a door 238 to one side and a door, as illustrated in FIG. 2, reference sign 238, to open and close the heat treatment chamber 236. The heat treatment system 200 can heat food by using, but is not limited to, a convection system 242, as illustrated in FIG. 2, reference sign 242, or heating tubes 244, as illustrated in FIG. 2, reference sign 244 or by electromagnetic waves, as illustrated in FIG. 2, reference sign 202 to 208.

These electromagnetic sensors can measure the amount of energy that has send to the food getting heated and the energy that is received after a short period of time to calculate difference in energy distributions. In another embodiment of the present invention, the monitoring system 10 does both monitoring the area in front of the heat treatment chamber as well as observing the inside of the heat treatment chamber. In another embodiment of the invention these sensors 214, 216, 222 such as cameras can be placed within the oven door, as illustrated in FIG. 2, reference sign 214 or 216 or 222, with a view point into the heat treatment chamber 236, either the camera can move or the optical way is guided via an optical system 212, 218, 224 comprising at least one of mirrors or lenses, as illustrated in FIG. 2, reference signs 221, 218, 224 and; or reflecting surfaces to also observe the area in front of the heat treatment machine 200 or heat treatment machine door 238.

Another embodiment of the invention the camera at the oven door 238 not only is used while the door 238 is closed while also the door 238 is opened to detect foodstuff 228, 232 accommodated in a loading dish or tray 230 in the target area. In this embodiment of the present invention foodstuff 240 in front of the heat treatment machine 200 can be detected while loading or unloading the heat treatment machine 200. Another embodiment in case the door 238 of the heat treatment chamber 236 comprises a window, wherein the sensor 214 or 216 observes the inside of the heat treatment chamber 238 through the window of the door, as illustrated in FIG. 2, reference signs 210, 220, and 226, the sensor 214, 216, 222 such as a camera, or photodiode array, may be adapted to observe food to be loaded into the heat treatment chamber 236 through the window 226 of the door 238 being in an opened state.

The monitoring results may be used to store information for quality insurance or to use it as data for a machine learning system such as using deep neural networks or for initiating process steps with the heat treatment chamber such as pre-heating or creating a certain climate in the heat treatment chamber 236 or applying specific electromagnetic energy in the radio frequency range to the food 228, 232 in different energy levels in different zones of the oven, or opening and closing the door 238 or starting or adapting a cooking or baking or proofing.

In order to monitor the food or foodstuff 240 being loaded or unloaded into a heat treatment machine 200, sensors 214, 216, 222 such as a camera or a photo diode array or detector arrays or photodiodes or beam sensors can be used. These detectors 214, 216, 222 can be equipped with apertures such as from copper-based materials or ceramics or shielded glass, or metals to filter and improve signal quality. If necessary, the sensor capture or images can be improved by using illumination either from the heat treatment chamber or for the purpose of illuminating the area observed by the sensor. Illumination sources could be light bulbs, halogen lamp, fluorescent tubes, LEDs or laser diodes.

The illumination sources can be mounted around the opening of the heat treatment chamber 236, the door 238 of the heat treatment chamber 236, or attached to the inside of the oven door 238 and therefore combined with the sensor attachment. Especially in heat treatment chambers that treat food or foodstuff 228, 230, the influence of heat and steam, fats, water and other effects caused by cooking processes can be harmful for the sensor or sensors used to monitor the food processing or the food preparation. The positioning of the sensor, its alignment, eventually its optical system is critical to reduce heat and food processing impact and secure the sensor from water, steam, fats, flowers or any other influence arising from preparing or processing food or food stuff and to use as few sensors as possible with the most possible observation area of the loading and unloading process as well as while processing the food.

It is beneficial to use sensor mountings that can easily be exchanged, either only the parts that get dirty or the whole sensor unit itself. It is advantaged to position the sensor unit 216 above the heat treatment chamber 236, as illustrated in FIG. 2, reference sign 216, either in the top of the heat treatment system 200, or any other area in the heat treatment chamber 236 or in the loading zone of the heat treatment chamber 236. The sensor window 210, 220, 226 for the sensor unit integration, FIG. 2, reference signs 210, 220, 226, the glass plate of the unit can also be designed to be heated or cooled and absorb various of wavelength to minimize reflectivity's. The sensor unit 216 can also be mounted with a mounting device mounted above the heat treatment chamber door such as with an arm or as mounted at an optional hood, as illustrated in FIG. 2, reference sign 216, aligned to observe the outside of the oven, both when the door is closed, as well as when it is opened. The sensor unit can also be designed to have different sensor alignments or to be able to move the sensor or the mounting and change its alignment.

An optical system 212, 218, 224, as illustrated in FIG. 2, including of a lens, FIG. 2, reference signs 212, 218 and 224, or several lenses or reflective surfaces such as mirrors also including of convex or concave shapes could be used to either maximize the sensor observable area such as the in front of the oven. The optical system can either be mounted above the heat treatment chamber opening or within the door of the heat treatment chamber 236 or in the heat treatment system 200. It is beneficial to use surfaces in the mounting and surrounding the sensor that have less reflectivity such as in matte black color. The optical system could have use coatings or surfaces reflective to certain wavelengths that protect the optical system from infrared heating or electromagnetic energy in the radio frequency range. The optical system 212, 218, 224 can also be designed in a way that it allows both, a view into the heat treatment chamber 236 and in front of the heat treatment chamber 236. If the sensor 214, 216, 222 is a camera, it is beneficial to have the optical system designed in a way that one part of the image represents a view into the heat treatment chamber and another part of the image represents a view in front of the heat treatment chamber.

Hereof, the optical system 212, 218, 224 may comprise a mirror system, wherein the view point of the camera is directed by the mirror system into a first direction providing a view into the heat treatment chamber and into a second direction providing a view in to the front of the heat treatment chamber 236.

The sensor unit 214, 216, 222 is connected to a processing unit 1820 (cf. FIG. 14) that processes the sensor data and determines feature data. Feature data could include of detecting different food 228, 232 or on a dish, tray or plate 230, or foodstuff 240 being present in the observation area, determining the kind of food and selecting cooking or baking programs, or observing moving directions to determine loading and unloading processes and the level or positioning in the heat treatment chamber 236 by the means of using machine learning or image processing methods. The feature data could be also used to train different kind of classification methods such as, but not limited to Support vector machines, linear classifiers, quadratic classifiers, kernel estimation, k-nearest neighbor, boosting, decision trees, random forests, neural networks. Feature data can include of indicators or measurements or feedback from the RF antennas or of the intensities of the target field RF intensity distribution or the amount of energy or power absorbed over a range of sets of respective values of one or more parameters from the heat treatment chamber 236 or in the cavity.

In another embodiment of this invention feature data can include of spectral wavelength data, intensities within different frequencies or frequency bands to extract characteristic data. In another embodiment of this invention RF energy or light or acoustic wavelengths can be used to send a probe towards the target area or towards the food stuff and the reaction or reflection or emissions or impulse response can be used to extend the feature data and be used to extract relevant characteristics of kind and state of food stuff. It is advantaged to also combine and extend these feature data with data gathered from camera images in particular the visible wavelength ranges and temperature probe data, such as data from insertion thermometers including multiple measurement points. The images may be gathered within the heat treatment chamber 236 or when loading or unloading the heat treatment chamber 236 or when preparing or presenting the food. In particular, could visual or temperature data from a preparation area already be used to identify the kind of food or its state before entering the heat treatment chamber 236.

This could be from temperature sensor data for instance from a pan or cooking appliance. The visual data could be from any observation point or path through point of the food stuff. Characteristics next to temperature or kind of food could also be visual characteristics such as counts or calibre of the food, such as the thickness of a salmon or steak and the number thereof. Feature data can also be extended with scale information of the food either gathered during the preparation process or within the heat treatment chamber. This could provide an indication of the kind of food as well as of the state of the food or the step currently in within a cooking sequence of a recipe or a guided cooking process.

The feature data can be extended and combined in a structured data set. Machine learning can be used to learn features to distinguish between kinds of food and the state of food and the stage of a cooking process. It is advantaged to have machine learning algorithms pick the relevant characteristics from any source of the named and combined feature data, which is relevant to the present food process. These feature data can be stored and used to identify food and the state of the food. It is advantaged invention to use these characteristics to determine multiple kinds of food vertical or horizontally distributed within the heat treatment chamber as well as the state of food such as doneness. It further is advantaged to treat and heat food differently within the heat treatment chamber 236.

In an embodiment of the invention RF heating can be combined with convection oven or hot air distributors or grill elements. The determination of food in its kind and state can be used to apply the appropriate heat processing. Such as applying heat from hot surfaces or hot air to melt and brown cheese or breaded crusts or dough pieces while using RF heat to reach a certain doneness in a piece of meat. In another embodiment of this invention the classification result can be used to pick a heat treatment chamber control program and adapt the same.

If RF elements are being used for generating heat in a heat treatment chamber, often insulations and shielding must be used to minimize the effect or interferences outside of the heat treatment chamber. This may result to that either no direct look can be taken into the heat treatment chamber or just through dark surfaces such as tinted or reflection shielded windows. Often bakers and chefs do want to visually see the food currently being treated within the heat treatment chamber. It is an advantaged invention to use a camera directed towards the inside of the heat treatment chamber to capture images and to show these images or improved or combined images thereof on a screen attached to the heat treatment chamber or on a screen of another device that is in a remote distance of the heat treatment chamber. The screen size may be larger than 5 inch in diameter. Images can be shown on multiple screens at the same time.

According to an embodiment an oven using radio frequency (RF) for heating is provided which comprises a camera directed towards the inside of the heat treatment chamber.

The feature data could also be used to establish if food has been moved into the oven and if the processed food has been removed from the inside of the heat treatment chamber. This analyzation of the data set could be also used to identify if already cooked food was re-entered to the heat treatment chamber, so the machine learning system learns which process steps has not been accomplished and use these extracted feature data to improve their intelligence of monitoring food process stages and steps. It is advantages to use the feature data to assess the caliber or volume of food and counts of food. With the identification of the food using the representation characteristics and classification via previously stored data, the size of the food identified in the target area can be assessed with its image size and the optical geometry of the sensor or camera positioning after a calibration step.

Multiple individually identified food items can also be counted, by summing all objects identified within an image. The derived information of the volumes, calibers and counts and kind of food items can then be validated and adjusting the information of analysis of the radio frequency reflected energy intensities.

A higher reflective RF intensity combined with a larger assessment of the volume of an identified food item can then become a feature within an artificial neural network or classifier used in the control to use higher cooking energy or longer cooking times. Thus a thicker slice of steak can get more heat energy than a thinner slice within the same cooking process. Feature data can be collected for identified items at multiple steps of a cooking process, the joint feature data could be represented by a JSON object or Jason object or other datasets.

In order to strengthen the identification, at one step of the cooking process steps, other identifying technologies may be used, such as reading barcodes, QR codes, color codes or signs or labels or OCR detected text or from an inventory tracking system. Any sensor can be cooled with ventilation or Peltier coolers. Glass and windows with multiple planes of glass can be shielded, coated, heated and tinted. The camera sensor could also include of programmable detectors that can adjust detection behavior.

Cameras and attached filters can be visible wavelength area or infrared band or specialized for any other frequency band. A sequence of images detected by a sensor can also be used to detect movement and detect direction thereof. Thus, this could be used to identify, if a plate is loaded into or unloaded from the heat treatment machine. A white light source could be directed towards the target area and the reflected light of the food stuff could be separated in spectrum by a prism. Thus spectral intensities can be detected and stored as characteristic of the food item and become part of the feature data. This can in particular also be used to identify food and its state or temperature. This can also be used to identify bacterial infestation or allergens or gluten present in the food stuff.

Thus, a heat treatment and food preparation monitoring system may comprise a sensor unit having at least one sensor to determine current sensor data of food being loaded to the heat treatment chamber; a processing unit to determine current feature data from current sensor data to determine different kind of food and the position of the different kind of food in the heat treatment chamber, and a control unit to control the heating process wherein the heating of the food is controlled by electromagnetic energy in radio frequency range based on the classified kind of food and the position. After the different varieties of food in the different zones of the oven has been detected by the sensor unit, different amount of electromagnetic energy in radio frequency, specific for the detected food may be used to heat up, or cook the food. Further, a heat treatment and food preparation monitoring system is provided, which may comprise a sensor unit having at least one sensor to determine current sensor data of food being heated or being loaded to and from the heat treatment chamber; a processing unit to determine current feature data from current sensor data; and an optical system with at least one lens to capture sensor data from an area or space in front of the heat treatment chamber. The sensor unit may comprise at least one camera. The heat treatment monitoring system and food preparation monitoring may further comprise a heat treatment chamber door that comprises at least one glass window. The heat treatment monitoring system and food preparation monitoring may further comprise a heat treatment chamber door that comprises a loading system.

FIGS. 3 to 11 show still further embodiments of a monitoring system 10 and a food preparation system 300 of the present invention.

Figure 3:
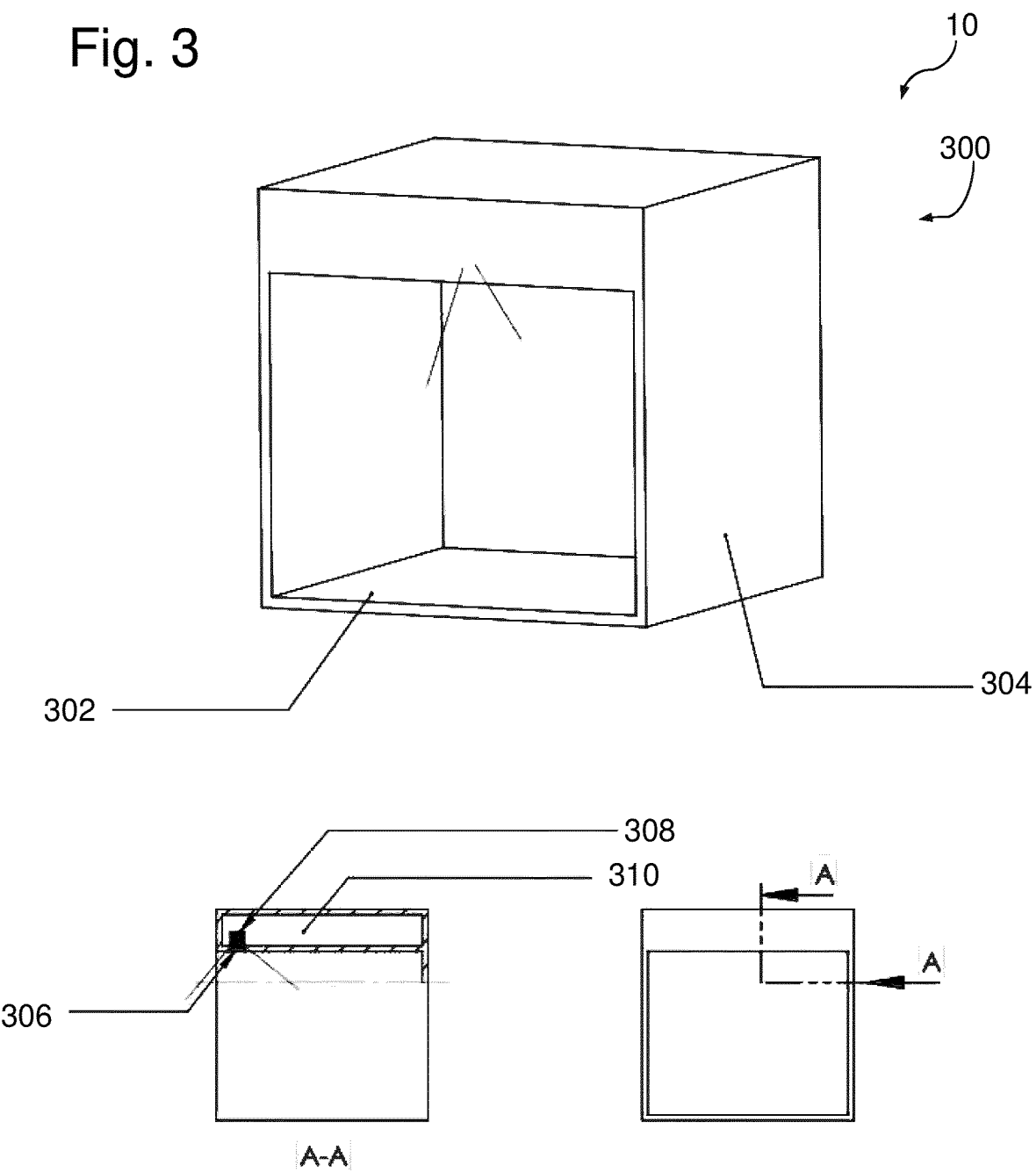

FIG. 3 shows an embodiment of a food preparation system being a warm holding cabinet 300. Warm holding cabinets are intended to hold food in trays to minimize serving and maintain food quality times. The current models in question have an internal operating temperature of ~110 C/~225 F. Such a warm holding cabinet 300 may have a warm holding chamber 302 within an equipment body 304, in which an electrical circuit may be accommodated to heat the warm holding chamber 302. Furthermore, electronic components may be accommodated within the equipment body 304, such as sensors 1812 or actuators 1900 or the complete monitoring system 10, the functionality of which will be described in all detail below with regard to FIG. 14. Although the following description is focused on a warm holding chamber 300, it shall be emphasized that all features described with regard to the warm holding cabinet 300 can be also applied to the food preparation systems 100, 200 as described above such as a heat treatment system for food, wherein the heating is performed either by convection heating or by means of RF heating such as done by a microwave oven. In addition, the respective features can also be applied to further food preparation systems such as a food storage rack or a cooling rack for food after having been heat treated such as having been baked.

The warm holding chamber 302 captures most of the interior of the warm holding cabinet 300. Inside the warm holding chamber 300 food is kept warm and is stored for a limited duration before being sold to customers or being transported to a next food preparation step. The food may be placed and/or stored on a number of shelf compartments or trays which can be supported at the warming holding chamber walls. The food may also be placed on moveable carts with several trays, which can be moved inside the warm holding chamber 302. Inside the warm holding chamber 302 a heat source is provided, which is used to keep the food in a warmed state. Moreover, also a ventilation system may be comprised inside the warm holding chamber 302 to distribute the heat produced by the heat source more evenly.

According to an embodiment, the warm holding cabinet 300 may be employed in a restaurant operation, for example of a fast food chain, wherein the food such as Hamburgers or French fries is loaded into the warm holding cabinet 300 on a first side or front side by restaurant operators and is unloaded by sales assistants for selling the food to customers in a warmed state directly from the warm holding cabinet 300. In this embodiment, the shelf compartments may be mounted into the warm holding cabinet 300 in a tilted way such that the food being loaded from a front side of the warm holding chamber 302 slides to the back side of the warm holding chamber 302 to be unloaded by the sales assistant or waiter. In this case, the warm holding chamber 302 can be accessed by a front opening and a back opening. Thus, the warm holding cabinet 300 has an entry, located near a cooking area where food is inserted, and an exit, located near the food packaging area where food is removed for sale.

Figure 6:
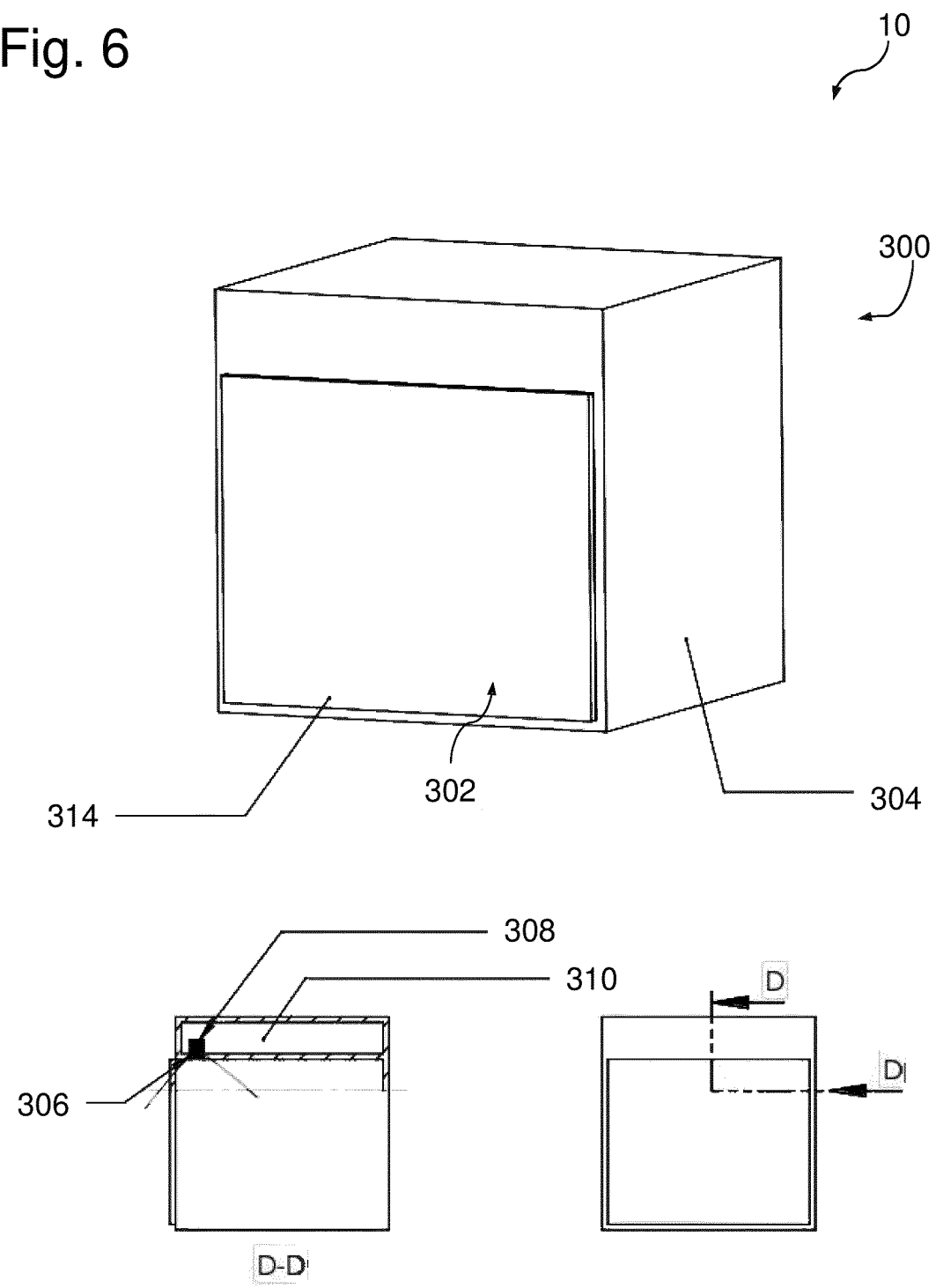
Figure 7:
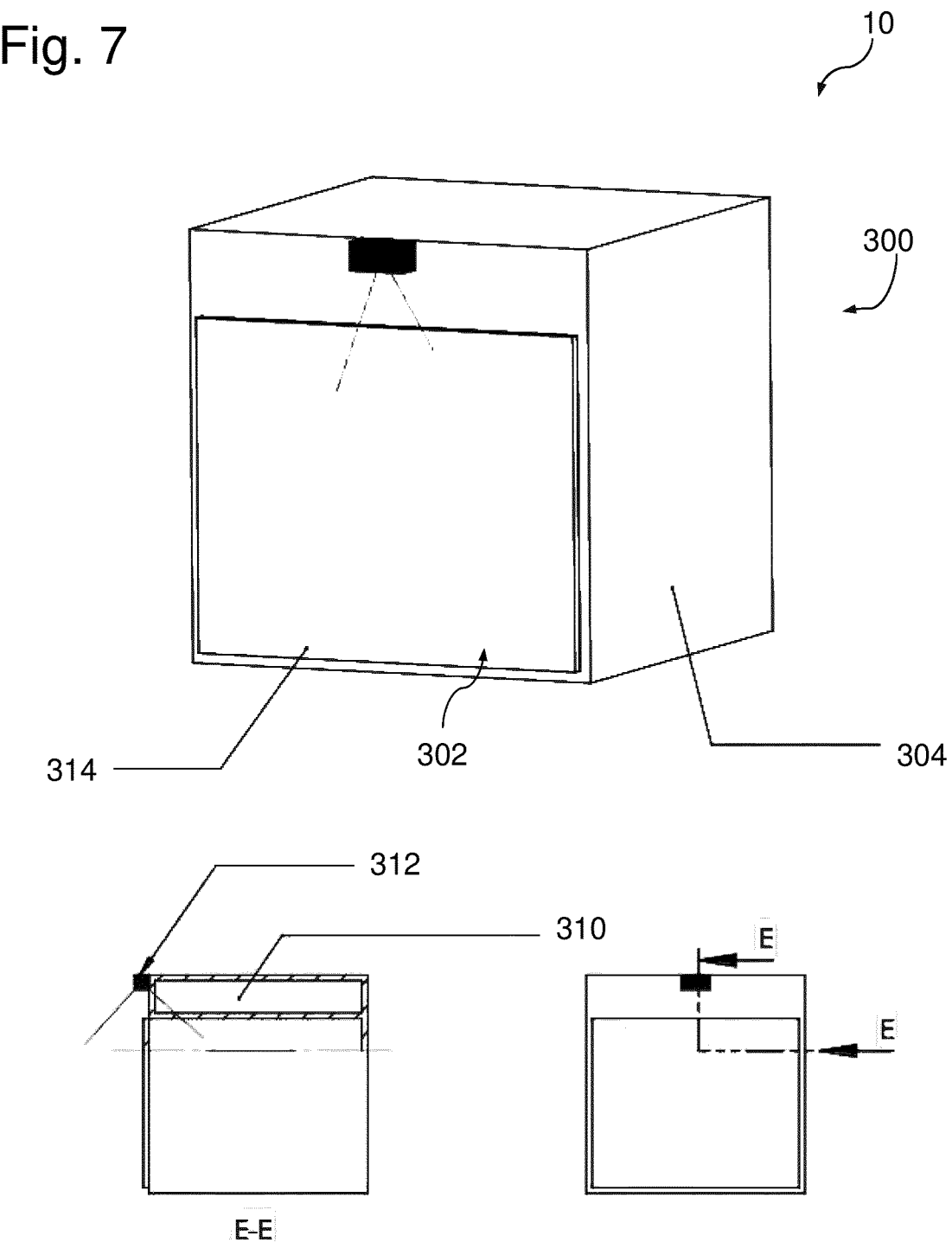

The warm holding chamber 302 may have, as described above, two openings on a front and back side, respectively. However, the warm holding chamber 302 may have also only one opening at a front side, wherein loading and unloading of food is done from the same side at the front of the warm holding cabinet 300. The opening(s) may be opened and closed by a warm holding cabinet door 314, as shown in FIGS. 6 to 8. It is, however, also possible that the opening(s) are closed by a strip curtain to keep the heat within the warm holding chamber 302. It is further possible that a jet air curtain is provided at the opening(s) of the warm holding chamber 302.

As can be seen from FIG. 3, an internal sensor module 308 is located within a control electronics space 310 of the warm holding cabinet 300. The internal sensor module 308 may comprise a camera or an array of photodiodes to observe the inside or the area in front of the warm holding chamber 302 through an aperture 306 provided within a ceiling part of the warm holding chamber 302. The aperture 306 may be closed by an internal ceiling window. The internal ceiling window may be a glass window or a window made from a material being transparent within a preferred wavelength range of electromagnetic radiation. The internal ceiling window may be transparent within a visible wavelength range, i.e. between 380 nm to 780 nm. The internal ceiling window may be, however, also transparent within an infrared wavelength range. In order to prevent a loss of heat out of the warm holding chamber 302, the internal ceiling window may be a double glass window having a first glass pane on the control electronics space 310 side and a second glass pane on the warm holding chamber 302 side. The double glass window may prevent heat dissipation between the first window and the second window by providing a special gas or a vacuum between the first window and the second window. The internal ceiling window closing the aperture 306 may be flush with the inner ceiling wall of the ceiling part of the warm holding chamber 302, to enable an easy cleaning of the window in a same process as a cleaning process of the warm holding chamber 302.

The camera of the internal sensor module 308 may be any conventional camera which is able to provide image data in a computer accessible form. The camera may for example be charged coupled device (CCD) camera or a complementary metal-oxide-semiconductor (CMOS) camera or a time of flight camera. The camera obtains images of the food to be loaded into or unloaded from or stored within the warm holding chamber 302. As will be described below these images may be used for automatically monitoring the loading/unloading/storing of food in the warm holding chamber.

The inside of the warm holding chamber 302 gets illuminated by an illumination apparatus. The illumination apparatus may be arranged inside the warm holding chamber 302. The illumination apparatus may also be located outside the chamber 302 to illuminate an area in front of the front side or the back side of the warm holding chamber 302 to illuminate food to be loaded into or unloaded from or stored within the warm holding chamber 302. The illumination apparatus may be any conventional light emitting device, e.g. a light bulb, a halogen lamp, a photodiode or a combination of several of these devices. The illumination apparatus may be focused on the food to be loaded into or unloaded from or stored within the warm holding chamber 302. In particular, the illumination apparatus may be adjusted or focused such that there is a high contrast between the food to be loaded into or unloaded from or stored within the warm holding chamber 302 and the surrounding interior of the warm holding chamber 302 or between the food and tray and/or carts on which the food is located before loading/after unloading. Such a high contrast may be also supported or generated solely by using special colors for the light emitted by the illumination apparatus.

As can be seen from FIG. 4, an external sensor module 312 may be mounted to an upper front side of the warm holding chamber 302. As already discussed above, there may be a further opening of the warm holding chamber 302 at its back side. Thus, an external sensor module 312 may be also mounted to an upper back side of the warm holding chamber 302. The external sensor module 312 may comprise a camera or an array of photodiodes as described above. The external sensor module 312 is mounted in such a way to the warm holding chamber 302 that an area in front of the warm holding chamber 302 can be observed, to monitor loading/unloading of food.

The internal sensor module 308 and the external sensor module 312 may also comprise a radio frequency sensor to detect, for example, RFID tags of food being loaded/unloaded into/from the warm holding chamber 302.

Figure 5:
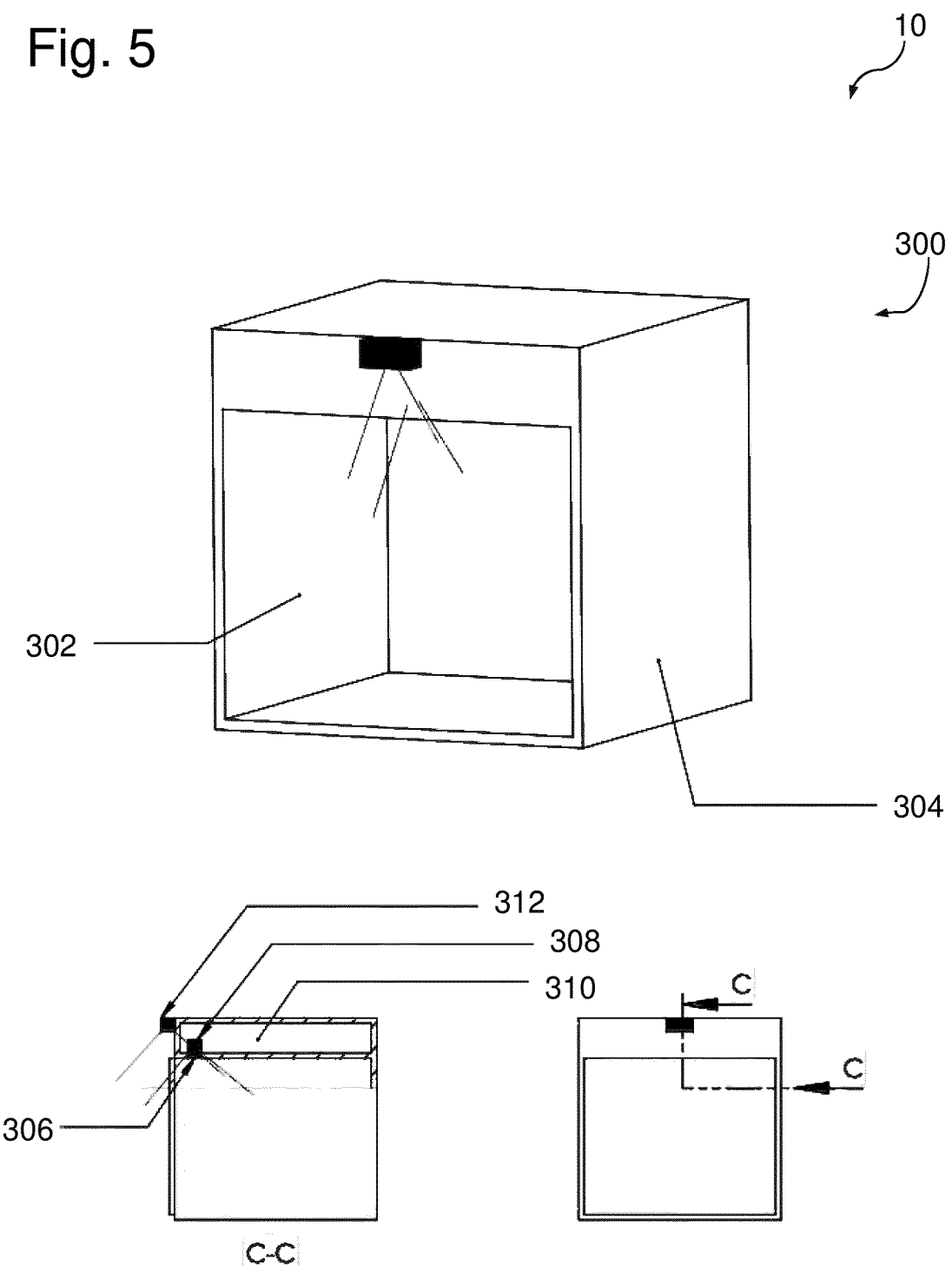

As can be seen from FIG. 5, the internal sensor module 308 and the external sensor module 312 may be provided together with the warm holding chamber 302, to optimize an observation of the loading/unloading of food and to further enable monitoring of food being stored in the warm holding chamber 302.

FIGS. 6 to 8 show similar embodiments as shown in FIGS. 3 to 5, respectively, subject to providing the warm holding cabinet door 314 for closing/opening a front opening and/or back opening of the warm holding chamber 302. By means of the warm holding cabinet door 314, heat is kept within the warm holding chamber 302, thus reducing energy consumption of the warm holding cabinet 300.

Figure 9:
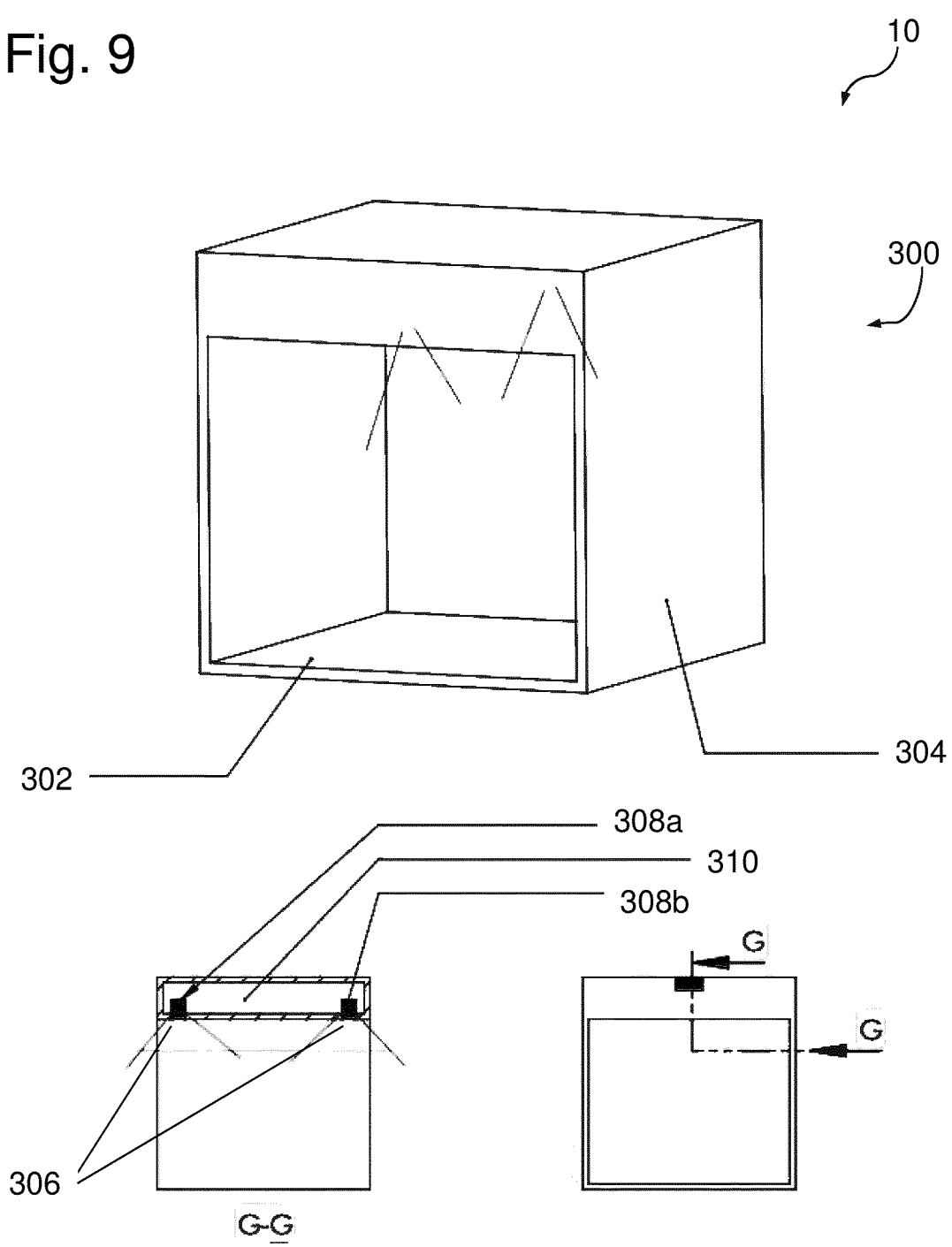

As can be seen from FIG. 9, two internal sensor modules 308a and 308b at respective apertures 306 within the ceiling part of the warm holding chamber 302 may be provided at a front ceiling part and a back ceiling part of the warm holding chamber 302. Thus, the complete inner space of the warm holding chamber may be observed by the two internal sensor modules 308a and 308b. Respective internal ceiling windows for closing the respective apertures 306 may be provided as described above.

Figure 10:
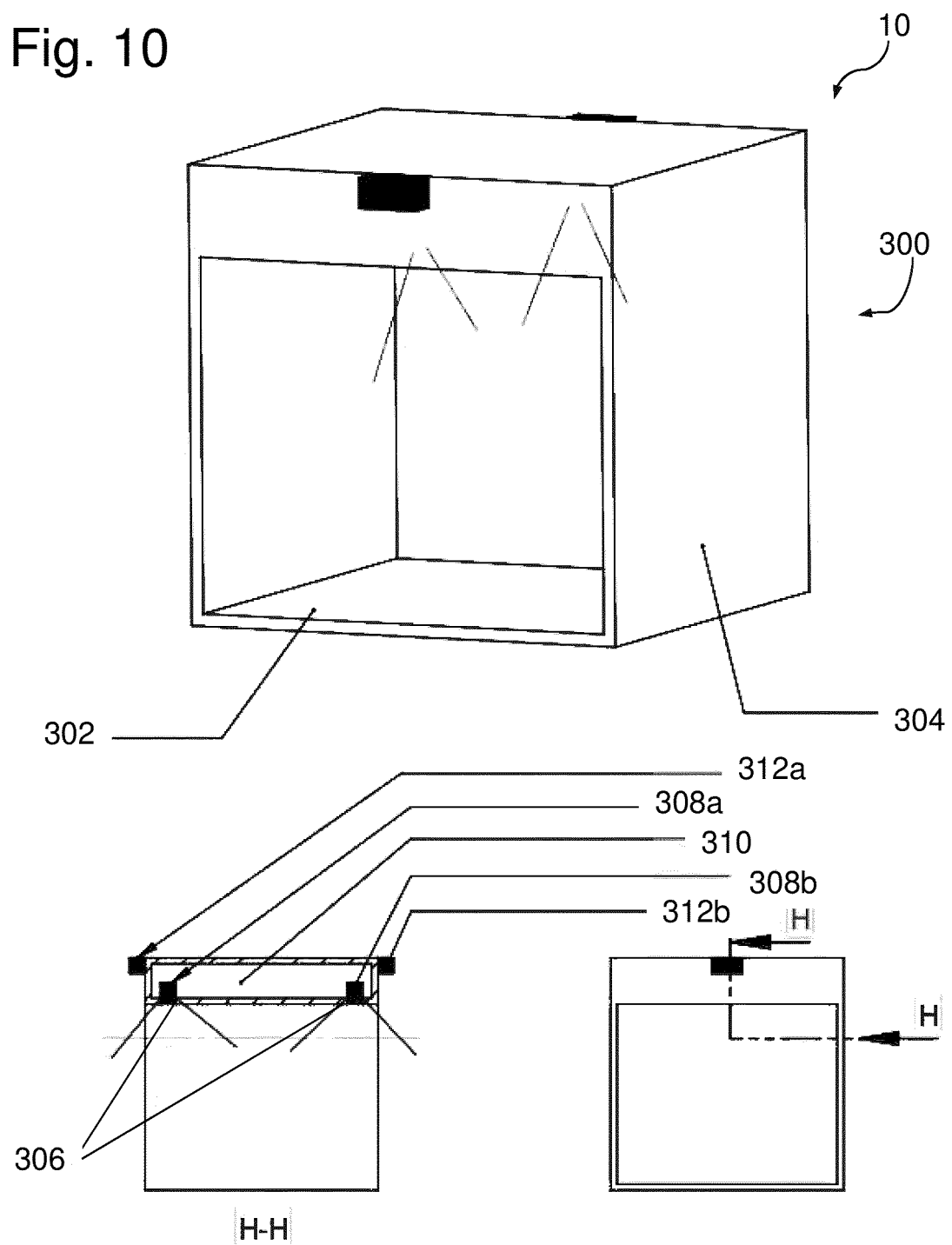

As can be seen from FIG. 10, further two external sensor modules 312a and 312b may be mounted to an upper front side of the warm holding chamber 302 and to an upper back side of the warm holding chamber 302, respectively. Thus, the complete front and back space of the warm holding chamber may be observed by the two external sensor modules 312a and 312b.

Figure 11:
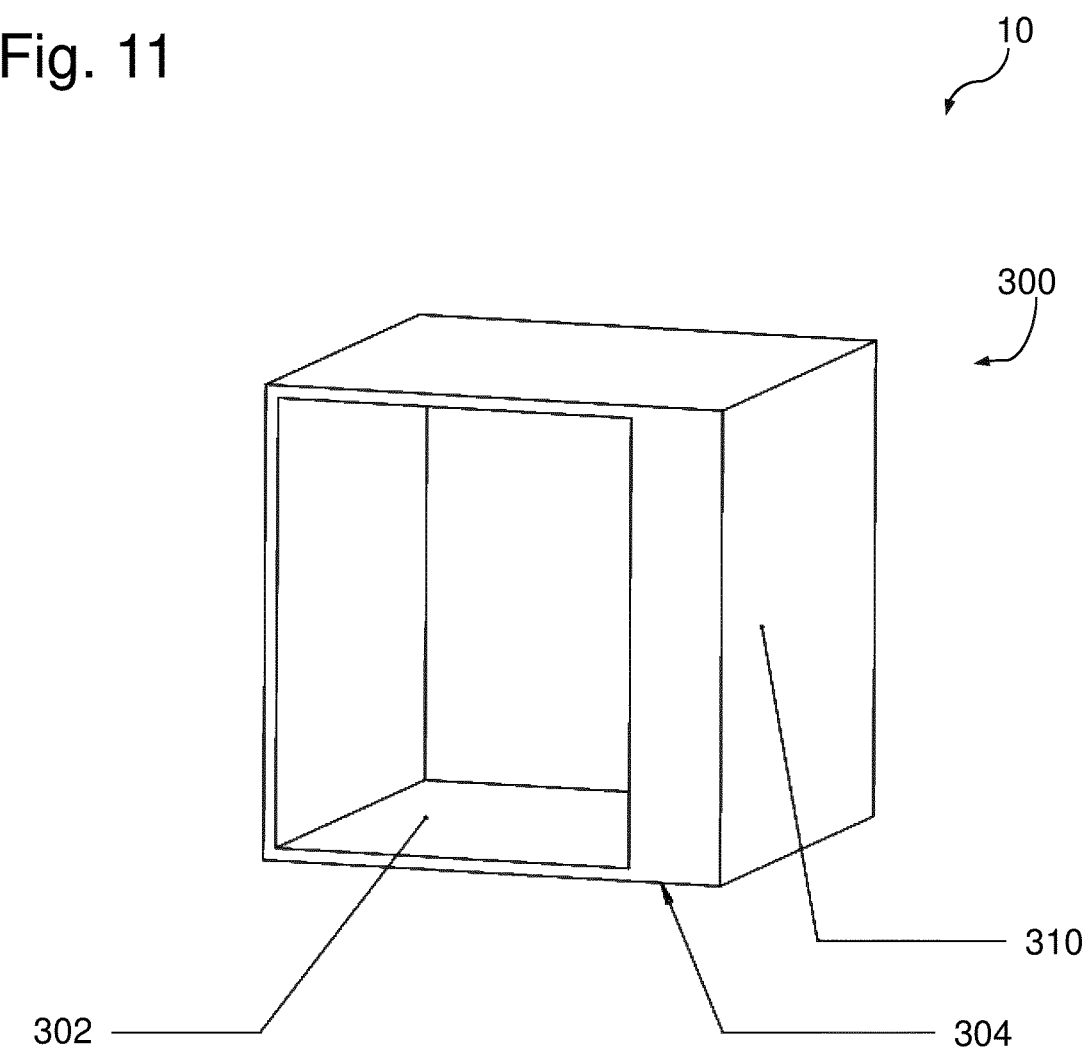

As can be seen from FIG. 11, the control electronics space 310 is not limited to be located in an upper area of the warm holding chamber 302, but is it is also possible that the control electronics space 310 is located in a side part (as shown) or in a base part (not shown) of the warm holding chamber 302. It is further possible that the internal sensor module 308, 308a or 308b are located next to a side wall part or a base wall part of the warm holding chamber 302 having respective apertures closed by respective windows such as an internal sidewall window or an internal basewall window, wherein the same feature may apply for these windows as for the internal ceiling window as described above.

Figure 12:
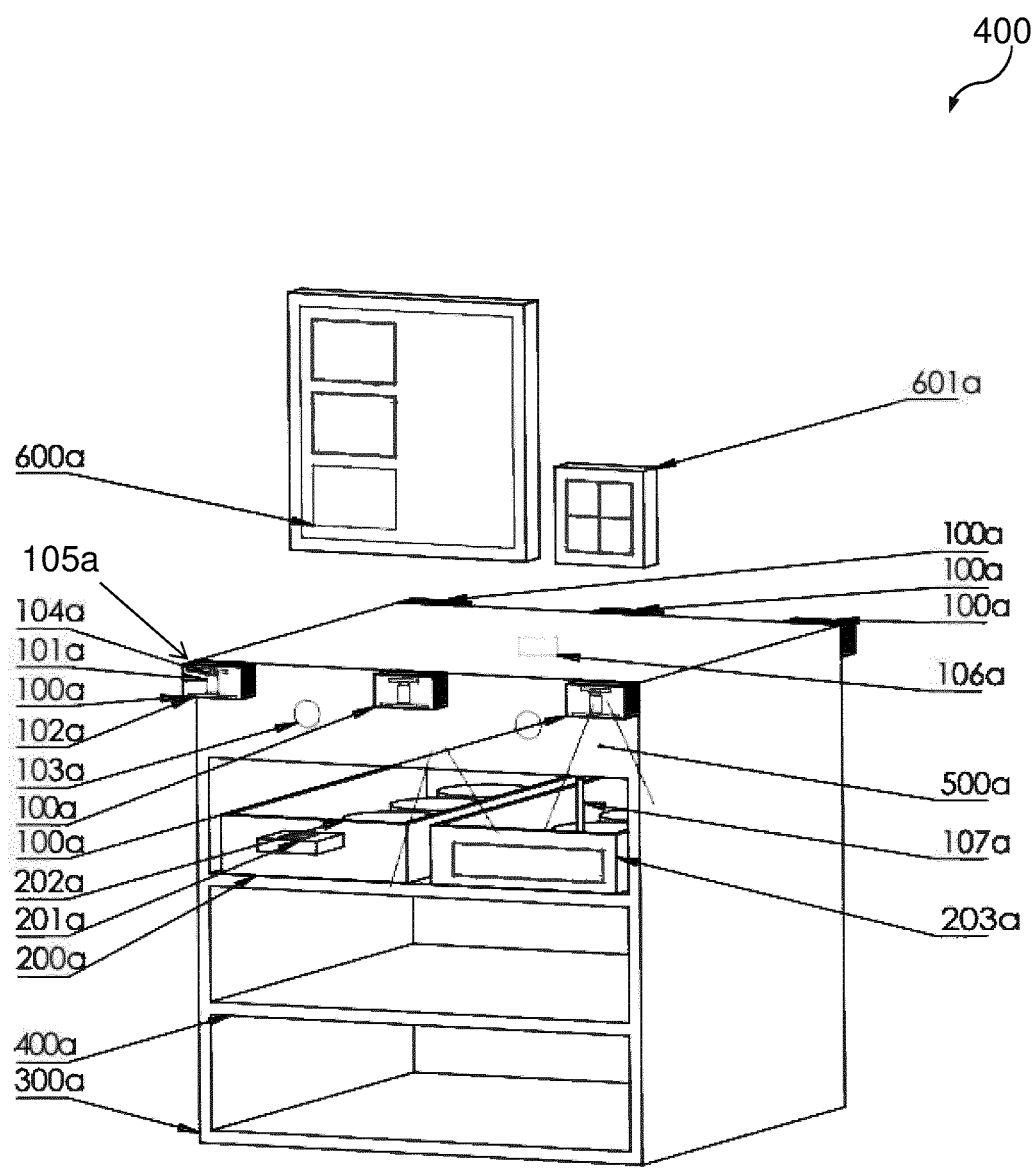
FIG. 12 shows a schematic front view of another embodiment of a monitoring system for a food preparation system.

FIG. 12 shows an embodiment of a food preparation system being a warm holding cabinet 300. As can be seen from FIG. 12, an universal holding/warm holding cabinet/heat treatment chamber 400, in the following warm holding cabinet 400, comprises at least one layer/level 400a and a display/LED area 500a. Furthermore, a connected digital display for cooking pipeline, or a user interface 600a may be provided in an upper space above the warm holding cabinet 400, to be connected with the monitoring system 10. In addition, a connected (wired or unwired) keypad 601a may be provided, to be connected with the monitoring system 10.

Figure 14:
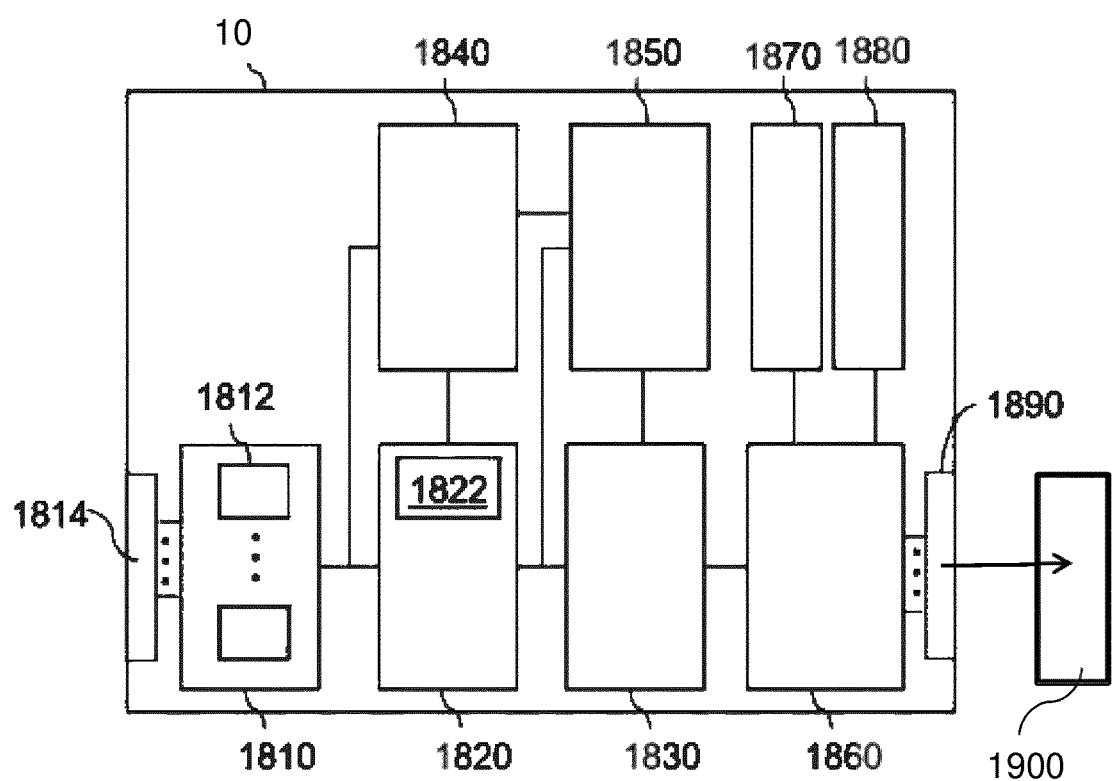
FIG. 14 shows a block diagram of a monitoring system according to an embodiment of the present invention.

Reference sign 100a shows different possible positions 100a for the sensor unit 1810 or the sensor 1812 (FIG. 14). As already discussed above, an optical system 101a may be provided as external or internal sensor module. The optical system 101a may be protected by a sensor window 102a. In addition, an illumination unit or a display or color code unit 103a may be provided to support identification of the food to be loaded/unloaded into the warm holding chamber 400. Therefore, also an IR diode 105a may be provided, wherein also a sensor/camera/time of flight camera 104a may be employed. In addition, an antenna/RF amplifier may be provided, to identify the food on the basis of RFID tags, for example. In order to maintain the set temperature of the warm holding chamber 400, a temperature probe 107a may be provided. In the level/shelf 400a, at least one food tray 200a may be accommodated. Within or on the food tray 200a, an identifier 201a may be provided, to support identification of the food tray 200a, by means of an RFID tag, or an optical identification label such as a barcode, QR code, or color code, for example. The food tray 203a itself may have different colors or shapes, to support identification of the food tray 203a.

Figure 13:
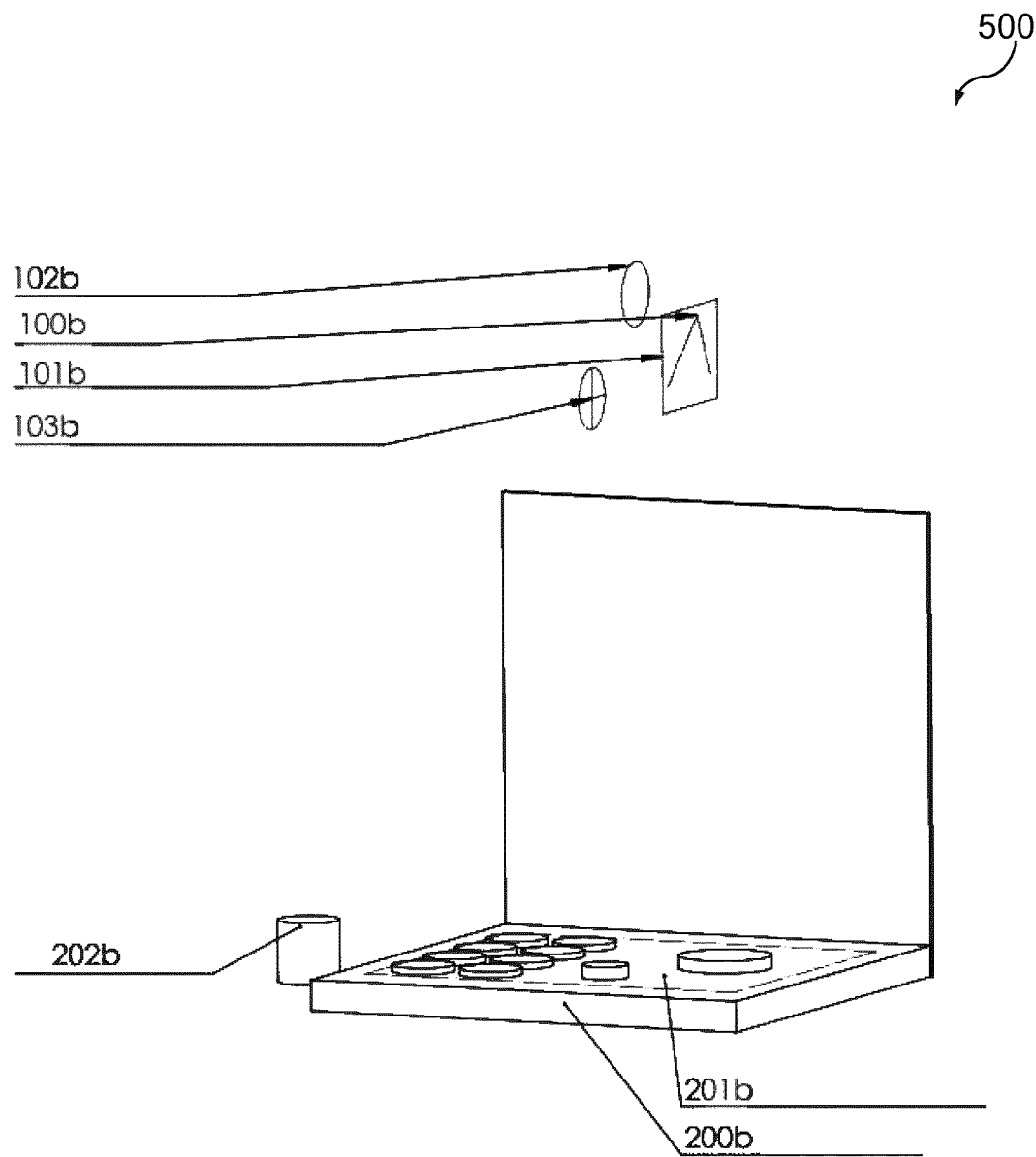
FIG. 13 shows a schematic front view of another embodiment of a monitoring system for a food preparation system.

FIG. 13 shows a further embodiment of a food preparation system being a grill/clam grill unit 200b, in the following grill 200b. As can be seen from FIG. 13, the grill 200b comprises a defined grill surface area 201b, on which food is heat treated. A seasoning area 202b may be located next to the defined grill surface area 201b. Located above the grill 200b, a sensor 100b constituting the sensor unit 1810 or the sensor 1812 (cf. FIG. 14) may be provided, to observe the heat treatment process of the food by the grill 200b. The sensor 100b may be accommodated within a sensor housing 101b. An illumination 102b is provided above the grill 200b. A grease prevention fan 103b may be provided next to the sensor 100b, to prevent staining or contamination of the sensor 100b, in particular the optical components of the sensor 100b.

A block diagram of an embodiment of the monitoring system 10 is shown in FIG. 14. The monitoring system 10, accordingly, comprises a sensor unit 1810 having at least one sensor 1812 to determine current sensor data of food. The food may being loaded into a food preparation system 100, 200, 300, being unloaded from a food preparation system 100, 200, 300, 400, 500 being stored and kept warm within a food preparation system 100, 200, 300, 400, 500 being heated within a food preparation system 100, 200, 300, 400, 500 being prepared within a food preparation system 100, 200, 300, 400, 500 being processed within a food preparation system 100, 200, 300, being cooled within a food preparation system 100, 200, 300, 400, 500 being made within a food preparation system, or being composed from different food parts within a food preparation system.

According to an embodiment of the present invention, the monitoring system 10 for a food preparation system 100, 200, 300, 400, 500 may comprise the sensor unit 1810 having at least one sensor 114; 214, 216, 222; 308, 312, 308a, 308b to determine current sensor data of the above food, which may be loaded or unloaded to or from a food processing chamber 102; 236; 302 of the food preparation system 100, 200, 300, 400, 500. The monitoring system 10 may further comprise a processing unit 1820 to determine current feature data from current sensor data of the above food. The monitoring system 10 may further comprise a monitoring unit 1830 adapted to determine a current heating process state in a current heating process of monitored food by comparing the current feature data with reference feature data of a reference heating process. The heat treatment monitoring system further comprises a learning unit 1840 adapted to determine a mapping of current sensor data to current feature data, by which dimensionality of the current sensor data may be reduced. The learning unit 1840 may be further adapted to determine reference feature data of a reference heating process based on feature data of at least one training heating process. The learning unit 1840 may be further adapted to generate a classification of feature data into respective classes of characteristic data of the above food. The monitoring system 10 may further comprise a classification unit 1850 adapted to determine characteristic data of the above food, which may be food 228, 232 being present within the food processing chamber 102; 236; 302, from the current feature data by classifying the current feature data. The monitoring system 10 may further comprise a control unit 1860 being adapted to inform or alert an user or to set operation parameters of the food preparation system 100, 200, 300 based on the determined characteristic data of the above food, in particular food being present within the food processing chamber 102; 236; 302.

It should be emphasized that the respective units 1820, 1830, 1840, 1850, and 1860 may be provided separately or may also be implemented as software being executed by a CPU of the monitoring system 10.

According to an embodiment, the food preparation system 100, 200, 300, 400, 500 may be a heat treatment system for food and the food processing chamber 102; 236; 302 may be a heat treatment chamber, wherein a heating process of the food 228, 232 being present within the food processing chamber 102; 236; 302 is controlled by electromagnetic energy in radio frequency range based on the characteristic data of the food 228, 232. Herein, the characteristic data of the food 228, 232 may be at least one of a classified kind of food and a position of the food within the food processing chamber 102; 236; 302. After the different varieties of food in the different zones of the food processing chamber 102; 236; 302 has been detected by the sensor unit 1810, different amount of electromagnetic energy in radio frequency, specific for the detected food may be used to heat up, or cook the food.

The characteristic data of the food may also comprise the quantity of at least one piece of food being present within the food processing chamber 102; 236; 302. Herein, the characteristic data of the food may further comprise at least one of the respective size, the respective type or kind, the respective position within the food processing chamber, or the respective duration being located within the food processing chamber of the at least one piece of food being present within the food processing chamber 102; 236; 302.

The characteristic data of the food shall be understood as data being descriptive of the properties of the food being present in the food preparation chamber. The characteristic data of the food are determined by classification of the current feature data from current sensor data of food being loaded/unloaded into/from the food preparation chamber. Current feature data is generated by mapping the current sensor data from a sensor data space to a feature data space. The feature data space may have a lower dimensionality as the sensor data space, as described above and below. The classification is performed by classical classification methods such as Support Vector Machines or the like, wherein the characteristic data of the food comprises a number of categories such as whole number of pieces of food, number of pieces of a certain type, size, shape, color, type of the food, which have each different classes such as small, medium, large, XL for the category size. In other words, the characteristic data gives an characteristic information on the food being present within the food preparation system or chamber.

The sensor unit 1810 may comprise at least one camera. The sensor unit 1810 may comprise at least one sensor 1812, wherein a sensor 1812 may be any sensor as described in the description above, in particular a camera as described above. In particular, the at least one sensor 1812 of the sensor unit 1810 may comprise at least one of hygrometer, insertion temperature sensor, treatment chamber temperature sensor, acoustic sensors, scales, timer, camera, image sensor, array of photodiodes, a gas analyser of the gas inside the treatment chamber, means for determining temperature profiles of insertion temperature sensors, means for determining electromagnetic or acoustic process emissions of the food to be treated like light or sound being reflected or emitted in response to light or sound emitters or sources, means for determining results from 3D measurements of the food to be heated including 3D or stereo camera systems or TOF time of flight camera, or radar, or means for determining the type or constitution or pattern or optical characteristics or volume or the mass of the food to be treated. Further an RFID detector may be used as a sensor 1812 to identify RFID tags of food being loaded/unloaded/stored.

In an embodiment, the sensor unit 1810 comprises a camera as the only sensor 1812, which leads to the advantage that no further sensor has to be integrated in the monitoring system 10. Thus, the monitoring system 10 may be formed as a single and compact casing. It is, however, also possible to provide a sensor data input interface 1814 at the monitoring system 10, by which current sensor data of the above mentioned sensors can be read by the sensor unit 1810 and transferred to the processing unit 1820. The current sensor data of the sensors 1812 are not necessarily raw data but can be pre-processed, like HDR pre-processed pixel data of the camera or pre-processed sensor data of the laser triangulation sensors, which may contain, e.g. a calculated value of volume of the observed food piece. The current pixel data may comprise first pixel data corresponding to a first color, second pixel data corresponding to a second color, and third pixel data corresponding to a third color, wherein the first, second and third color corresponds to R, G and B, respectively. Herein, an illumination source for illuminating the food with white light is advantageous. It is, however, also possible to provide a monochromatic illumination source in a preferred wavelength area in the optical region, for example at 600 nm, to observe a grey pixel image in the respective wavelength. The sensor unit 1810 may further comprise an optical system with at least one lens to capture sensor data from an area or space in front of the food processing chamber 102; 236; 302.

The processing unit 1820, the monitoring unit 1830, the learning unit 1840 and the classification unit 1850 cooperate to provide a user with an optimized food heating or classification result based on machine learning techniques. Herein, the processing unit 1820 and the learning unit 1840 are provided to reduce the amount of current sensor data of the above at least one sensor 1812. In particular, the learning unit 1840 is adapted to determine a mapping of current sensor data to current feature data by means of a variance analysis of at least one training heating process, to reduce the dimensionality of the current sensor data. The learning unit 1840 may be integrated in the monitoring system 10 or may be an external unit located at another place, wherein a data connection may be provided, e.g. via Internet (as described below with regard to the usage of PCA-loops). The at least one training heating process may thus be based on current sensor data of the sensor unit 1810 of the local monitoring system 10, but also be based on current sensor data of sensor units of further monitoring systems at different places (on the world), provided the case the type of sensor data is comparable with each other. By means of training heating processes, the sensor data are reduced in dimensionality, wherein sensor data with the highest variance over time is weighted most.

The variance analysis performed by the learning unit 1840 comprises at least one of principal component analysis (PCA), isometric feature mapping (ISOMAP) or linear Discriminant analysis (LDA), or a dimensionality reduction technique, which have been described in all detail above. An interpretation and selection of dominant features may thus be performed by applying PCA to a sequence of food processing data. As described above in this way the features may be sorted by variance and the most prominent may be very beneficial for monitoring. By performing the analysis as described above, a mapping can be derived for mapping sensor data to feature data being reduced in dimensionality and being characteristic for the heating process being performed and being monitored by the monitoring system 10. The mapping, which may be also received from an external server, or may be stored in a memory in the monitoring system 10, is then applied by the processing unit 1820 to map the incoming current sensor data from the sensor unit 1810 to current feature data, which are then transmitted to the monitoring unit 1830. It is emphasized that in some cases, the "mapping" might be for some sensor data an identify mapping, thus some of the sensor data might be equal to the respective feature data, in particular with regard to pre-processed sensor data already containing characteristic values like the absolute temperature within the heating chamber, a volume value of the food to be heated, a humidity value of the humidity within the heating chamber. However, the mapping is preferably a mapping, in which the dimensionality of the data is reduced. The learning unit may be further adapted to determine a mapping of current feature data to feature data by means of a variance analysis of at least one training heating process to reduce the dimensionality of the current feature data.

The monitoring unit 1830 is then adapted to determine a current heating process state in a current heating process of monitored food by comparing the current feature data with reference feature data of a reference heating process. For example, a reference heating process or a predetermined heating program may be a sequence of feature data in time of a certain kind of food to be heated like a Croissant, which leads to an optimized heating or baking result. In other words, if the current feature data exactly follows the time dependent path of the reference feature data points in the feature space having the dimensionality of the number of chosen relevant features, the food will be heated in an optimized way after a predetermined optimized time, i.e. the Croissant will be baked perfectly. The optimized time may be dependent on the temperature within the heating or baking chamber.

The classification unit 1850 may be provided to determine characteristic data of the food being loaded/unloaded/stored in the food preparation system 100, 200, 300, 400, 500. For example, the classification unit may classify the type of food being loaded/unloaded/stored. This may be done by image processing of an pixel image of the food to be heated, e.g. by face recognition techniques. Herein, further techniques may be used such as feature detection for image processing, which may comprise the following steps: detection of edges, corners, blobs, regions of interest, interest points, processing of color or grey-level images, shapes, ridges, blobs or regions of interest or interest points. Feature from sensor data may also comprise target amplitude selection or frequency-based feature selection. Herein, edges are points where there is a boundary (or an edge) between two image regions. In general, an edge can be of almost arbitrary shape, and may include junctions. In practice, edges are usually defined as sets of points in the image which have a strong gradient magnitude. Furthermore, some common algorithms will then chain high gradient points together to form a more complete description of an edge. These algorithms usually place some constraints on the properties of an edge, such as shape, smoothness, and gradient value. Locally, edges have a one dimensional structure. After determining the type of food to be heated (bread roll, muffin, croissant or bread), the classification can be used to select a respective predetermined heating program or stored reference heating process corresponding to the respective type of food to be heated. In addition, sub-categories can be provided, for example small croissant, medium croissant, or big size croissant. Different reference heating processes may also stored with regard to non food type categories. For example, there may be a reference heating program corresponding to different time dependent environments or oven parameters.

The control unit 1860 may be adapted to determine optimized operation parameters of the food preparation system 100, 200, 300, 400, 500 based on the determined characteristic data of food being present within the food processing chamber 102; 236; 302. The control unit 1810 may be further adapted to track and quantify food being loaded or unloaded to or from a food processing chamber 102; 236; 302 based on the determined characteristic data of food being present within the food processing chamber 102; 236; 302. The control unit 1810 may also be adapted to perform scheduling intended for production management between process steps of the food preparation process. The control unit 1860 may, for example, monitor the duration of certain type of food within the food preparation chamber or warm holding chamber, to prevent that certain food is maintained too long within the warm holding chamber, making the food dry or not tasteful any more. By giving an alert to the assistant, the assistant can remove the respective food being longer as a predetermined time within the warm holding chamber by checking the display, which food is concerned. The food may be further recognized by the classification unit due to the packaging of the food. For example, a Hamburger being in green box may be distinguished over a Cheese Burger being in a red box. However, the artificial intelligence takes into account a plurality of sensor data to classify the type of food.

According to an embodiment, ongoing monitoring and control of a specific step of a process may be provided (e.g. proofing, retarding, baking, frying). Herein, process optimization is achieved by optimization of the control inputs to the system based on data gathered from sensor. Further, process quantification is achieved by tracking and quantification of various key process items (e.g. counting of food pieces, evaluation food piece sizes). By monitoring the loading/unloading of the food into/from the food preparation system 100, 200, 300, monitoring and planning of items/batches can be achieved.

In addition, the control unit 1860 is adapted to perform inventory/quantity management by tracking and quantification of food being loaded/unloaded (e.g. ensuring that food items are held within allowed time limits).

Furthermore, the control unit 1860 is adapted to perform production/time management by scheduling for production management between process steps (e.g. ensuring that sufficient oven capacity is available after proofing).

The control unit 1860 may be further adapted to stop the heating process based on a comparison of the current heating process state determined by the monitoring unit with a predetermined heating process state corresponding to an end point of heating. The control unit 1860 may be adapted to alert a user, when the heating process has to be ended.

Therefore, the monitoring system may comprise an alert unit 1870 and a display unit 1880. The display unit 1880 is provided to indicate characteristic data of the food, for example the current heating process state, for example the remaining heating or baking time.

The display unit 1880 may further show a current pixel image of the inside of the heat treatment chamber for visual monitoring of the food to be heated by a user. The control unit 1860 may be adapted to control the display unit 1880 being adapted to indicate a remaining time of the heating process based on a comparison of the current heating process state determined by the monitoring unit with a predetermined heating process state corresponding to an end point of heating and/or to display images of the inside of the heat treatment chamber.

The control unit 1860 is further connected to an output interface 1890 for controlling actuators 1900 on the basis of characteristic data of the food, as described above or below like a temperature control of a heating chamber, means to adapt humidity in the heat treatment chamber by adding water, or a control of the ventilating mechanism (ventilating shutter). The actuators may further include means for adapting the fan speed, means for adapting the differential pressure between the heat treatment chamber and the respective environment, means for setting a time dependent temperature curve within the heat treatment chamber, means for performing and adapting different heat treatment procedures like proofing or baking, means for adapting internal gas flow profiles within the heat treatment chamber, means for adapting electromagnetic and sound emission intensity of respective electromagnetic or sound emitters for probing or observing properties of the food to be heated.

In particular, the control unit 1860 is adapted to control operation parameters of the food preparation system 100, 200, 300, 400, 500 by means of actuators 1900, such as a temperature control of a heating chamber, means to adapt humidity in the heat treatment chamber by adding water or steam, a control of the ventilating mechanism, means for adapting the fan speed, means for adapting the differential pressure between the heat treatment chamber and the respective environment, means for setting a time dependent temperature curve within the heat treatment chamber, means for performing and adapting different heat treatment procedures like proofing or baking, means for adapting internal gas flow profiles within the heat treatment chamber, means for adapting electromagnetic and sound emission intensity of respective electromagnetic or sound emitters for probing or observing properties of the food to be heated.

A food preparation system 100, 200, 300, 400, 500 may comprise a food processing chamber 102; 236; 302 for food being loaded or unloaded to or from the same; and a monitoring system 10 as described above. The food preparation system 100, 200, 300 may further comprise a food processing chamber door 106, 238 including the sensor unit 1810 adapted to observe an area or space in front of the food processing chamber 102; 236; 302 when the food processing chamber door 106, 238 is opened. The sensor unit 1810 may be located above the food processing chamber to observe an area or space in front of or within the food processing chamber 102; 236; 302 through an aperture 306 in the ceiling part of the food processing chamber 102; 236; 302, which is closed by a window being flush with the ceiling part of the food processing chamber 102; 236; 302.

According to the present invention, the control unit 1860 is adapted to inform or alert an user or to set operation parameters of the food preparation system 100, 200, 300 based on the determined characteristic data of food being present within the food processing chamber 102; 236; 302. It shall be emphasized that the feature of setting operation parameters of the food preparation system 100, 200, 300 shall include all actions initiated by the control unit 1860 based on the determined characteristic data of food being present within the food processing chamber as described above. In particular, setting operation parameters of the food preparation system shall include initiating a certain procedure such as initiating a French fries drop or increasing inventory counters.

The invention claimed is:

1. A monitoring system for a food preparation system, comprising:
    a sensor unit that includes
        a front side camera to determine current front side camera data of food through a door to an external area of a food processing chamber of the food preparation system before being loaded into a front opening of the food processing chamber, and
        a backside camera to determine current back side camera data of food being unloaded to or from a back opening of the food processing chamber;
    a processing unit to determine current feature data from current camera data,
    a classification unit to determine characteristic data of food being loaded or unloaded within the food processing chamber from the current feature data; and
    a control unit adapted to inform or alert a user or to set operation parameters of the food preparation system based on the determined characteristic data of food being present within the food processing chamber, the control unit being adapted to monitor the duration that the food has been present in a warm holding chamber, and wherein the control unit is adapted to select a cooking or baking program based on feature data determined from the current front side and backside camera data.

2. The monitoring system of claim 1, wherein the food preparation system is a heat treatment system for food and the food processing chamber is a heat treatment chamber.

3. The monitoring system of claim 2, wherein a heating process of the food being present within the food processing chamber is controlled by electromagnetic energy in radio frequency range based on the characteristic data of the food.

4. The monitoring system of claim 3, wherein the characteristic data of the food is at least one of a classified kind of food and a position of the food within the food processing chamber.

5. The monitoring system of claim 4, wherein, after the at least one of the classified kind of food in the position of the food processing chamber has been detected by the front side camera, a different amount of electromagnetic energy in radio frequency, specific for the classified kind of food is used to heat up or cook the food.

6. The monitoring system of claim 1, wherein the characteristic data of the food comprises a quantity of at least one piece of food loaded into the food processing chamber.

7. The monitoring system of claim 6, wherein the characteristic data of the food further comprises at least one of a respective size, a respective type or kind, a respective position within the food processing chamber, or a respective duration of at least one piece of food loaded into the front opening of the food processing chamber.

8. The monitoring system of claim 1, wherein the front side camera mounted above an opening of the food processing chamber.

9. The monitoring system of claim 8, wherein the front side camera and the backside camera further comprise an optical system with at least one lens to capture an image from an external area or space in front or in back of the food processing chamber.

10. The monitoring system of claim 1, wherein the control unit is adapted to determine optimized operation parameters of the food preparation system based on the determined characteristic data of food being loaded or unloaded within the food processing chamber.

11. The monitoring system of claim 1, wherein the control unit is adapted to track and quantify food being loaded or unloaded to or from the food processing chamber based on the determined characteristic data of food being present within the food processing chamber.

12. The monitoring system of claim 1, wherein the control unit is adapted to perform scheduling intended for production management between process steps of a food preparation process.

13. A food preparation system, comprising:
    a food processing chamber for food being loaded or unloaded to or from the same; and
    the monitoring system of claim 1.

14. The food preparation system of claim 13, further comprising a food processing chamber door including the front side camera adapted to observe an area or space in front of the food processing chamber through a window of the door of the food processing chamber when the food processing chamber door is closed.

15. The food preparation system of claim 13, wherein the front side camera is located above the food processing chamber to observe an area or space in front of or within the food processing chamber through an aperture in a ceiling part of the food processing chamber, which is closed by a window being flush with the ceiling part of the food processing chamber.

16. The monitoring system of claim 10, wherein the control unit is adapted to determine a level or position of the food being loaded into the food processing chamber.

17. The monitoring system of claim 1, wherein the front side camera is adapted to determine the state of the food before being loaded into the front opening of the food processing chamber.

18. The monitoring system of claim 1, wherein the front side camera is adapted to determine the thickness of at least one piece of food.

19. The monitoring system of claim 1, wherein the front side camera is adapted to determine the volume of at least one piece of food.

20. The monitoring system of claim 1, wherein the front side camera is adapted to determine an oven zone into which at least one piece of food has been loaded.

* * * * *